(12) United States Patent
Slawinski et al.

(10) Patent No.: US 9,010,465 B2
(45) Date of Patent: Apr. 21, 2015

(54) ROBOTIC VEHICLE SYSTEMS FOR INSPECTING REMOTE LOCATIONS

(71) Applicants: Michael D. Slawinski, Buford, GA (US); Dennis L. Guthrie, Suwanee, GA (US)

(72) Inventors: Michael D. Slawinski, Buford, GA (US); Dennis L. Guthrie, Suwanee, GA (US)

(73) Assignee: Tobor Technology, LLC, Buford, GA (US)

(*) Notice: Subject to any disclaimer, the term of this patent is extended or adjusted under 35 U.S.C. 154(b) by 0 days.

(21) Appl. No.: 14/304,696

(22) Filed: Jun. 13, 2014

(65) Prior Publication Data

US 2014/0336846 A1    Nov. 13, 2014

Related U.S. Application Data

(63) Continuation of application No. 14/143,227, filed on Dec. 30, 2013, now Pat. No. 8,789,631, which is a continuation of application No. 13/436,904, filed on Mar. 31, 2012, now Pat. No. 8,651,206.

(60) Provisional application No. 61/516,219, filed on Mar. 31, 2011.

(51) Int. Cl.
| | |
|---|---|
| *B62D 55/065* | (2006.01) |
| *B60L 15/40* | (2006.01) |
| *B62D 55/00* | (2006.01) |
| *B62D 55/075* | (2006.01) |
| *B62D 55/10* | (2006.01) |
| *B62D 55/24* | (2006.01) |
| *E04D 13/00* | (2006.01) |
| *B25J 9/16* | (2006.01) |
| *B25J 5/00* | (2006.01) |

(52) U.S. Cl.
CPC .............. *B60L 15/40* (2013.01); *B62D 55/00* (2013.01); *Y10S 901/01* (2013.01); *B62D 55/075* (2013.01); *B62D 55/10* (2013.01); *B62D 55/24* (2013.01); *E04D 13/00* (2013.01); *B60L 2200/40* (2013.01); *B60L 2240/622* (2013.01); *B60L 2260/32* (2013.01); *Y02T 90/16* (2013.01); *Y02T 90/162* (2013.01); *B25J 9/1697* (2013.01); *Y10S 901/47* (2013.01); *B25J 5/005* (2013.01)

(58) Field of Classification Search
USPC ..................... 180/9.32, 7.1, 8.7, 167; 901/1
See application file for complete search history.

(56) References Cited

U.S. PATENT DOCUMENTS

| | | | | |
|---|---|---|---|---|
| 4,932,831 A | * | 6/1990 | White et al. ................. | 414/732 |
| 4,977,971 A | * | 12/1990 | Crane, III et al. ............. | 180/8.3 |
| 5,297,644 A | * | 3/1994 | Clar et al. .................... | 180/9.32 |
| 6,802,237 B1 | * | 10/2004 | Jones et al. ................... | 89/1.13 |
| 6,860,571 B2 | * | 3/2005 | Scheetz ........................ | 305/143 |
| 7,641,006 B2 | * | 1/2010 | Scheetz ........................ | 180/9.5 |
| 8,316,971 B2 | * | 11/2012 | Couture et al. ............. | 180/9.32 |
| 8,326,469 B2 | * | 12/2012 | Phillips et al. ................. | 701/2 |

* cited by examiner

*Primary Examiner* — John Walters
*Assistant Examiner* — James Triggs
(74) *Attorney, Agent, or Firm* — Culhane Meadows PLLC; J. Scott Anderson

(57) ABSTRACT

Devices, systems, and methods for inspecting and objectively analyzing the condition of a roof are presented. A vehicle adapted for traversing and inspecting an irregular terrain includes a chassis having a bottom surface that defines a higher ground clearance at an intermediate location, thereby keeping the center of mass low when crossing roof peaks. In another embodiment, the drive tracks include a partially collapsible treads made of resilient foam. A system for inspecting a roof includes a lift system and a remote computer for analyzing data. Vehicles and systems may gather and analyze data, and generate revenue by providing data, analysis, and reports for a fee to interested parties.

17 Claims, 25 Drawing Sheets

ROBOTIC VEHICLE SYSTEMS FOR INSPECTING REMOTE LOCATIONS

CROSS-REFERENCE TO RELATED APPLICATIONS

This application is a continuation of application Ser. No. 14/143,227, entitled "Roof Inspection Systems With Autonomous Guidance," filed Dec. 20, 2013, which is a continuation of application Ser. No. 13/436,904, entitled "Roof Inspection Systems and Methods of Use," which issued as U.S. Pat. No. 8,651,206 B2, and which claims the benefit of U.S. Provisional Application No. 61/516,219, entitled "Remote Roof Inspection Apparatus and Method of Use," filed Mar. 31, 2011. Each application identified above is incorporated herein by reference in its entirety in order to provide continuity of disclosure.

BACKGROUND

The following disclosure relates generally to roof inspection systems and methods of using roof inspection systems.

The tasks of climbing onto and inspecting a roof, on foot, are inherently dangerous. Every year, thousands of people are injured or killed in falls from a ladder or off a roof.

Roofs often include a variety of shapes, features and obstacles. For example, a roof may have multiple peaks and valleys, a high slope or pitch, and may include numerous obstacles such as chimneys, vents, skylights, rain gutters, power lines, roof-mounted equipment, natural debris, and other objects. In addition to the danger presented by these features, a roof inspector might not inspect areas of the roof that are difficult or dangerous. Weather conditions can make the task more dangerous and/or delay the inspection. Walking on a roof can damage the surface.

From roofing contractors to insurance company personnel, workers in a variety of endeavors must inspect a roof as part of their job duties and responsibilities. Proper roof inspection techniques—especially safety precautions—require extensive training, physical endurance, and years of practice developing the necessary skills Climbing and working safely on a roof requires large ladders, ropes, safety harnesses, and often a large truck to haul the equipment to the site. Providing a second person on site for assistance and safety adds cost to the process, without adding to the reliability of the final report.

The reliability of a roof inspection and analysis is limited by the subjective experience and motives of the roof inspector, who is often called upon to evaluate whether a roof should be repaired or replaced by an insurance provider. For example, a good roof inspector should be able to recognize and distinguish hail damage (often covered by insurance) and minor heat blistering (not covered). Roof inspectors rely on their experience and knowledge of the causes of various kinds of roof damage, using subjective methods to make a damage assessment and a recommendation to the insurer. The reliability of the roof assessment depends on the education, training, and field experience of the particular roof inspector who performed the work.

Subjective assessments are also of limited value because of the risk of bias in the judgment of the roof inspector. Bias against the roof owner can be present when the inspector works for an insurance company that has a financial interest in denying a damage claim. Bias in favor of the roof owner can be present when the inspector works for a roofing company or other interest that may profit from reporting that the roof should be repaired or replaced by the insurance company. The financial incentives, together with the inherently subjective nature of roof inspectors' opinions, have produced a climate of mistrust and suspicion.

Personal roof inspection is dangerous and unsatisfactory for at least the reasons described above. Aerial or satellite imaging of roof structures often produces low quality images, the equipment is subject to interference from cloud cover and trees, the cost is high, and it could take days or weeks to receive a report. Efforts at developing a remote roof inspection device have been unsuccessful because the problems of poor traction, poor durability, and inherent instability on steep surfaces and when crossing roof peaks have not been solved.

SUMMARY

A vehicle adapted for traversing and inspecting an irregular terrain, according to various embodiments, comprises (1) a chassis supported above a terrain by a pair of substantially continuous tracks near opposing left and right sides of the chassis, each of the tracks engaged with at least one driven sprocket and at least one free sprocket, wherein the chassis has a front end and a rear end with a longitudinal axis extending therebetween, and an upper deck and a generally opposing bottom surface, wherein the bottom surface defines a first clearance near the ends and a second clearance along a substantially transverse axis extending between the sides and located intermediate the ends, wherein the second clearance is substantially greater than the first clearance when the chassis is positioned on a substantially planar surface; (2) a motive system supported by the chassis and operative to propel the vehicle by engagement with one or more of the at least one driven sprockets, the motive system comprising the pair of tracks and at least one motor connected to and operative to propel the vehicle by engaging one or more of the at least one driven sprockets; (3) a power system supported by the chassis and providing energy to power the vehicle; (4) an imaging system supported by the chassis and comprising a main imaging assembly and a lens assembly; (5) a sensor system supported by the chassis and comprising one or more positional sensors and a plurality of range sensors; and (6) a control system supported by the chassis and electrically connected to the motive system, the power system, the imaging system, and the sensor system, wherein the control system comprises a guidance routine that, in cooperation with the imaging system and the sensor system, directs the motion of the vehicle in an autonomous mode across the terrain.

The guidance routine may include instructions to direct the vehicle: (a) to move forward from a starting location until the sensor system indicates a hazard or boundary; (b) to turn the vehicle away from the hazard or boundary; and (c) to autonomously survey the terrain by repeating steps (a) and (b) until the vehicle returns to an ending location near the starting location.

The imaging system may include a first camera and a second camera, wherein the main imaging assembly receives input from the first and second cameras and synchronizes the input to produce a stereographic image. The lens assembly may be spaced apart from and above the chassis.

The motive system may include a partially collapsible tread attached along each of the tracks, wherein the partially collapsible tread and the second clearance cooperate to substantially prevent overturning of the vehicle.

The control system may include a wireless router and a remote console having a wireless transmitter in communication with the wireless router, wherein the remote console comprises a remote computer and user interface controls for directing the motion of the vehicle in a semi-autonomous mode across the terrain.

According to various embodiments, a vehicle adapted for traversing and inspecting an irregular terrain, comprises: (1) a chassis comprising a fore sub-chassis connected by one or more hinges to a rear sub-chassis, the chassis supported above a terrain by a pair of substantially continuous tracks near opposing left and right sides of the chassis, each of the tracks engaged with at least one driven sprocket and at least one free sprocket, wherein the fore sub-chassis has a front end, an first upper deck, and a generally opposing first bottom surface, the first bottom surface defining a first clearance near the front end, and wherein the one or more hinges lie along a substantially transverse axis extending between the left and right sides of the chassis and define a second clearance, wherein the second clearance is substantially greater than the first clearance when the chassis is positioned on a substantially planar surface; (2) a motive system supported by the chassis and operative to propel the vehicle by engagement with one or more of the at least one driven sprockets, the motive system comprising the pair of tracks and at least one motor connected to and operative to propel the vehicle by engaging one or more of the at least one driven sprockets; (3) a power system supported by the chassis and providing energy to power the vehicle; (4) an imaging system supported by the chassis and comprising a main imaging assembly and a lens assembly; (5) a sensor system supported by the chassis and comprising one or more positional sensors and a plurality of range sensors; and (6) a control system supported by the chassis and electrically connected to the motive system, the power system, the imaging system, and the sensor system, wherein the control system comprises a guidance routine that, in cooperation with the imaging system and the sensor system, directs the motion of the vehicle in an autonomous mode across the terrain.

The chassis may include one or more limiters positioned to limit the motion of the fore sub-chassis relative to the rear sub-chassis.

The guidance routine may include instructions to direct the vehicle: (a) to move forward from a starting location until the sensor system indicates a hazard or boundary; (b) to turn the vehicle away from the hazard or boundary; and (c) to autonomously survey the terrain by repeating steps (a) and (b) until the vehicle returns to an ending location near the starting location.

The imaging system may include a first camera and a second camera, wherein the main imaging assembly receives input from the first and second cameras and synchronizes the input to produce a stereographic image. The lens assembly may be spaced apart from and above the chassis.

The motive system may include a partially collapsible tread attached along each of the tracks, wherein the partially collapsible tread and the one or more hinges cooperate to substantially prevent overturning of the vehicle.

The motive system may include a partially collapsible tread attached along each of the tracks, wherein the partially collapsible tread and the second clearance cooperate to substantially prevent overturning of the vehicle.

The control system may include a wireless router and a remote console having a wireless transmitter in communication with the wireless router, wherein the remote console comprises a remote computer and user interface controls for directing the motion of the vehicle in a semi-autonomous mode across the terrain.

BRIEF DESCRIPTION OF THE DRAWING

Figure 1:
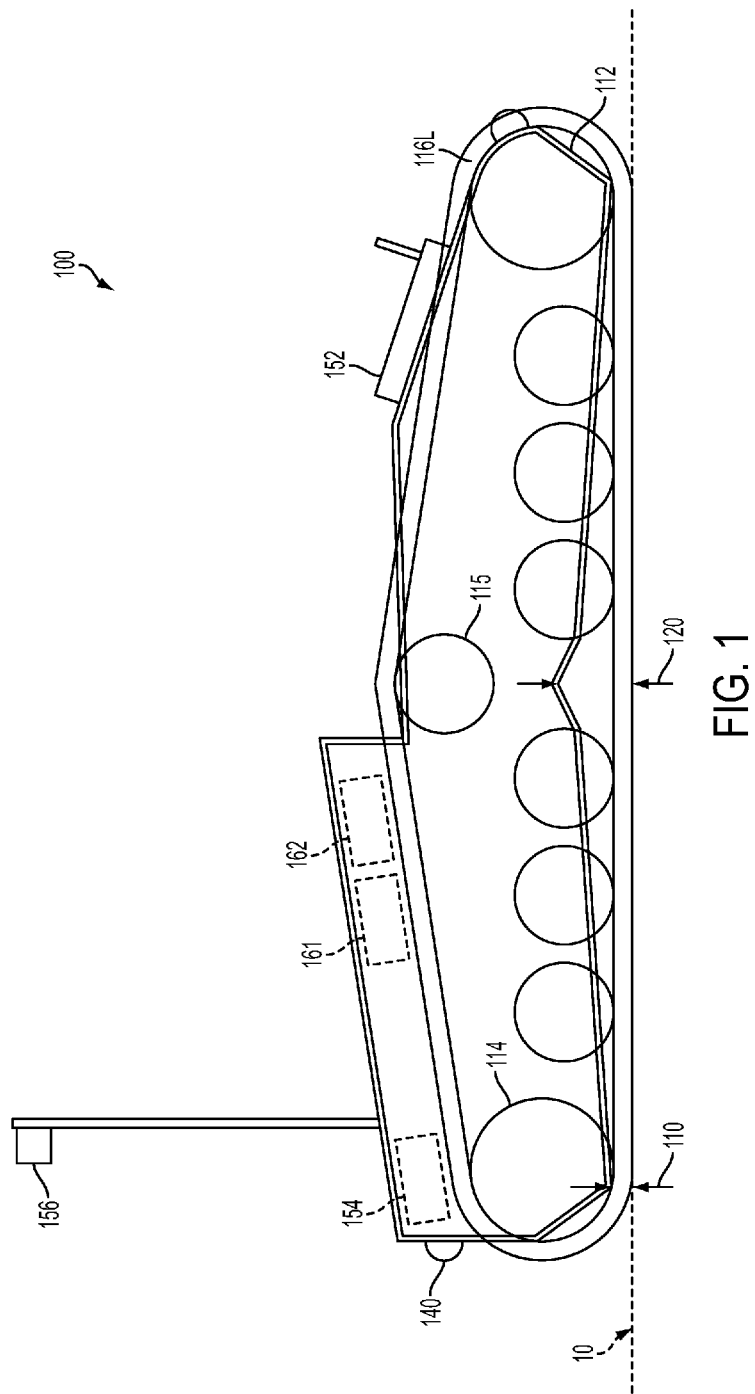

Having thus described various embodiments in general terms, reference will now be made to the accompanying drawings, which are not necessarily drawn to scale, and wherein:

FIG. 1 is an illustration of a side view of a vehicle supported by tracks, according to particular embodiments.

Figure 2:
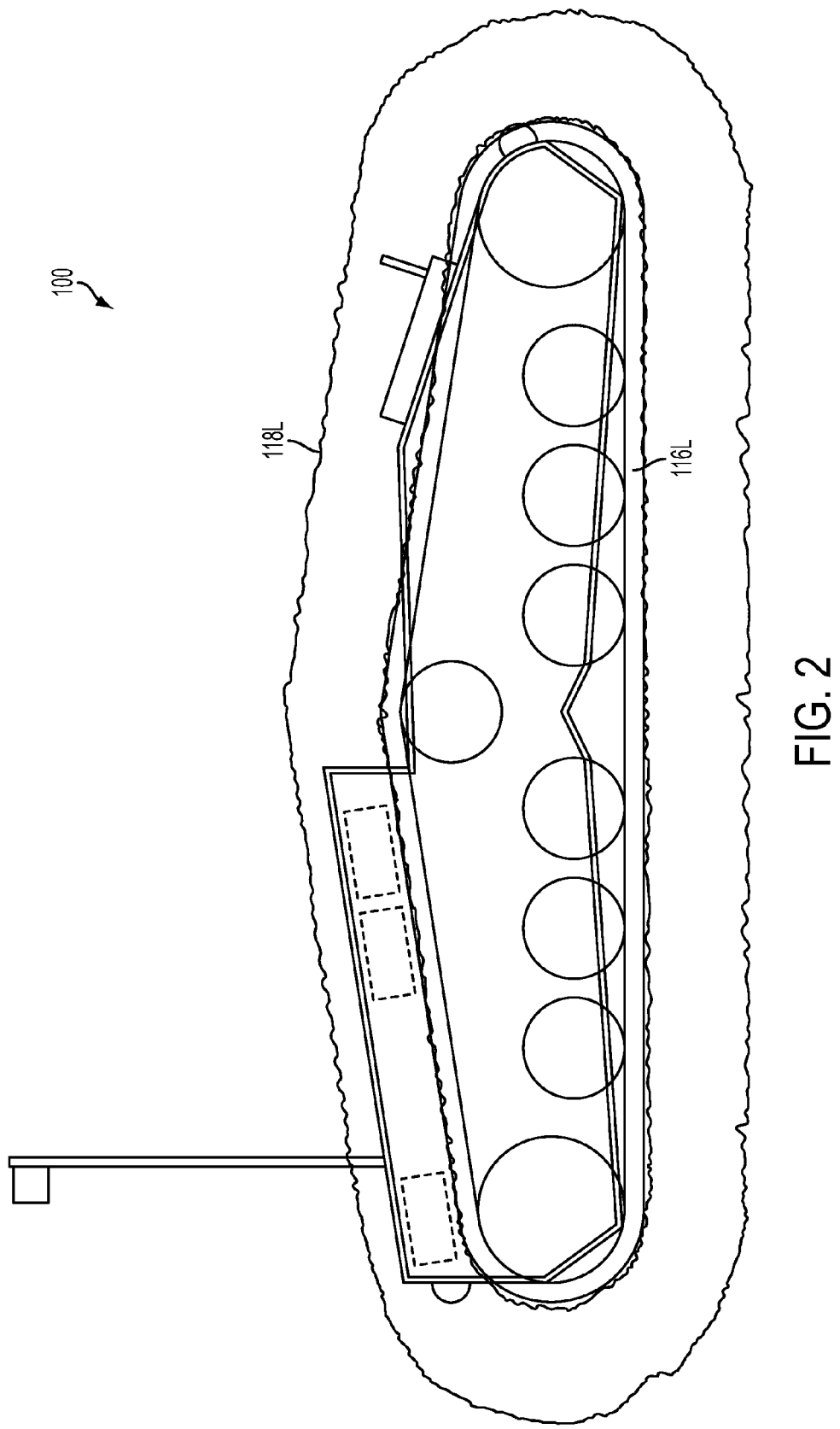

FIG. 2 is an illustration of a side view of a vehicle supported by tracks, as shown in FIG. 1, with partially collapsible treads attached to the tracks, according to particular embodiments.

Figure 3:
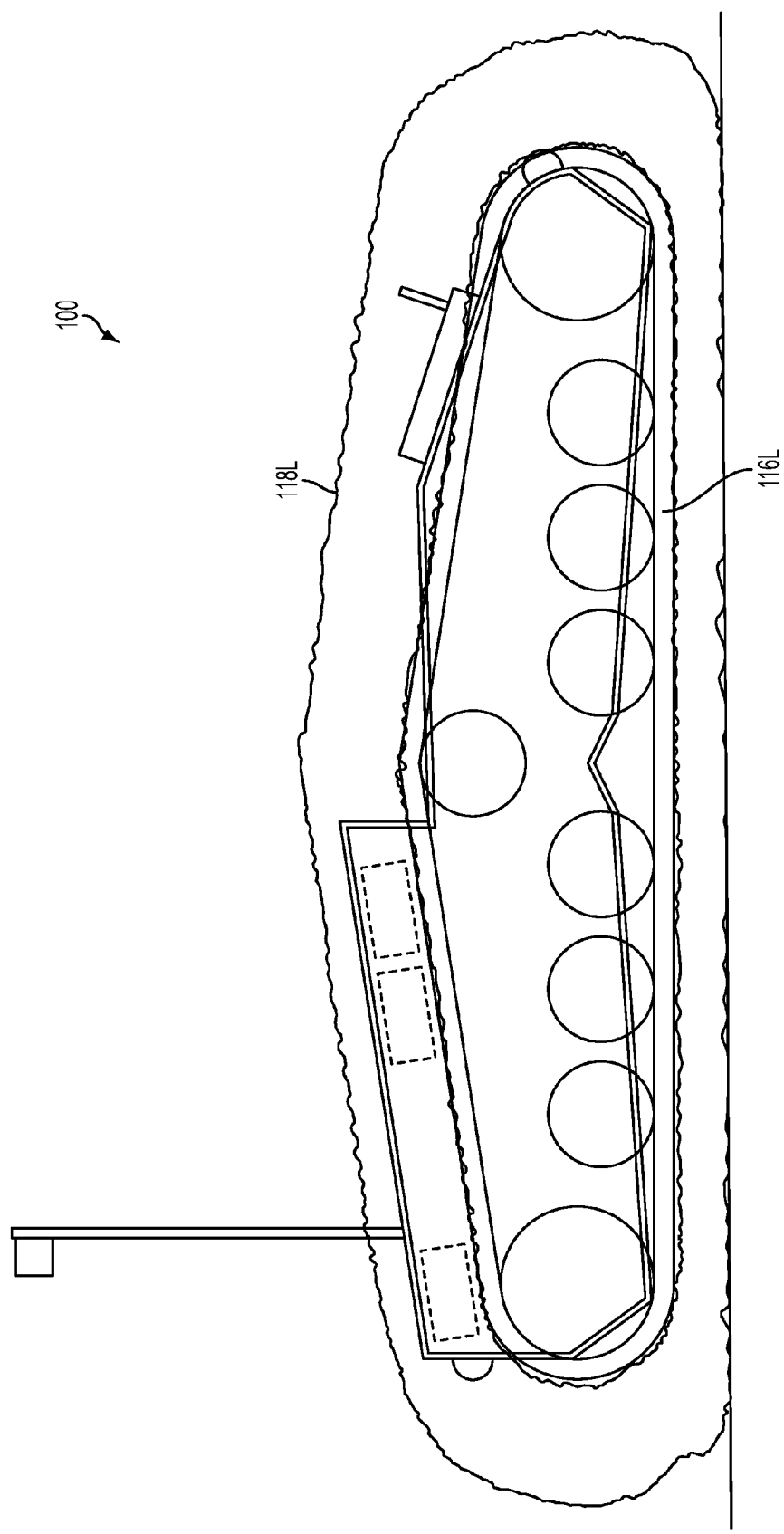

FIG. 3 is an illustration of a side view of a vehicle supported by tracks and partially collapsible treads, as shown in FIG. 2, positioned on a flat surface.

Figure 4:
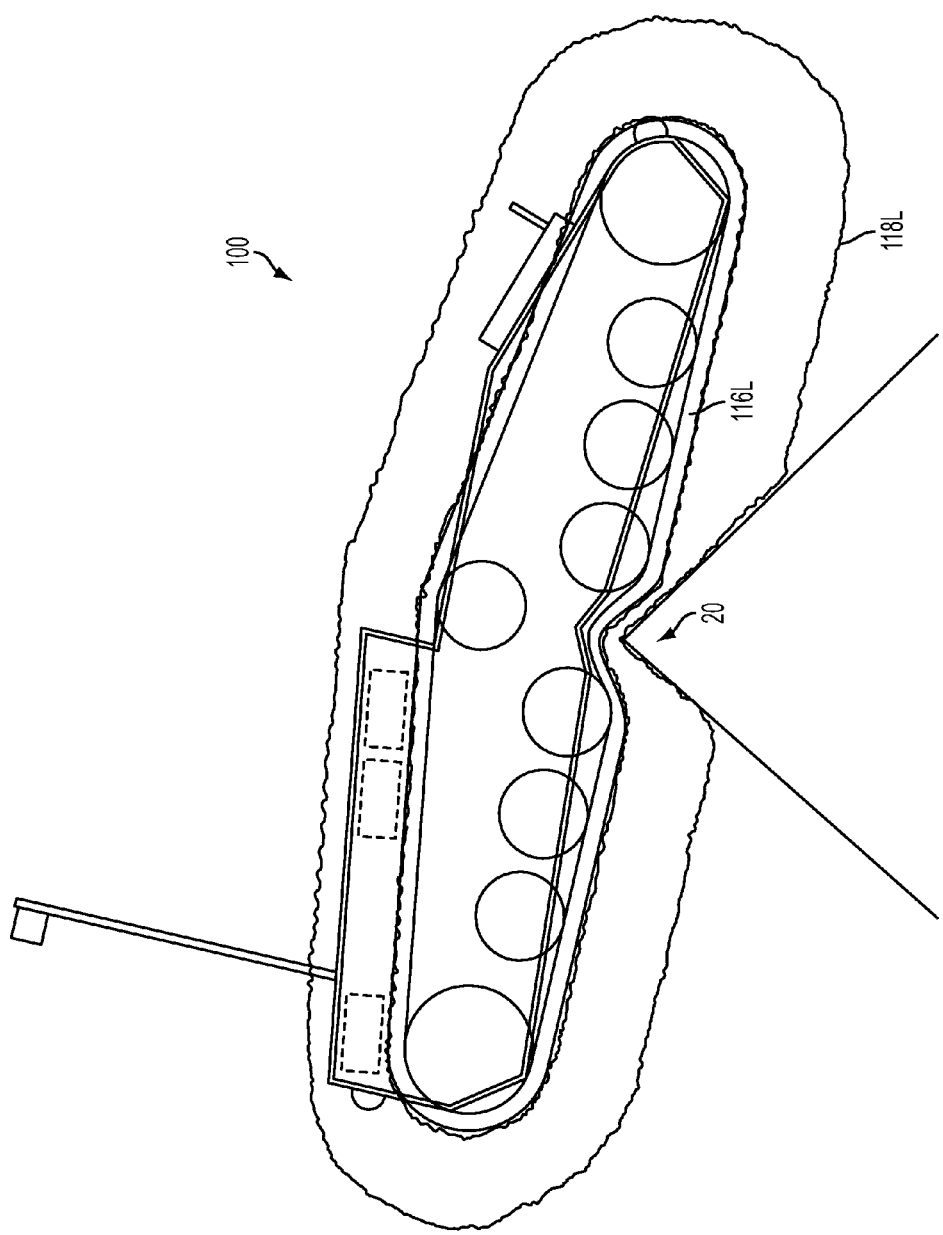

FIG. 4 is an illustration of a side view of a vehicle supported by tracks and partially collapsible treads, as shown in FIG. 2, positioned on the peak of a roof.

Figure 5:
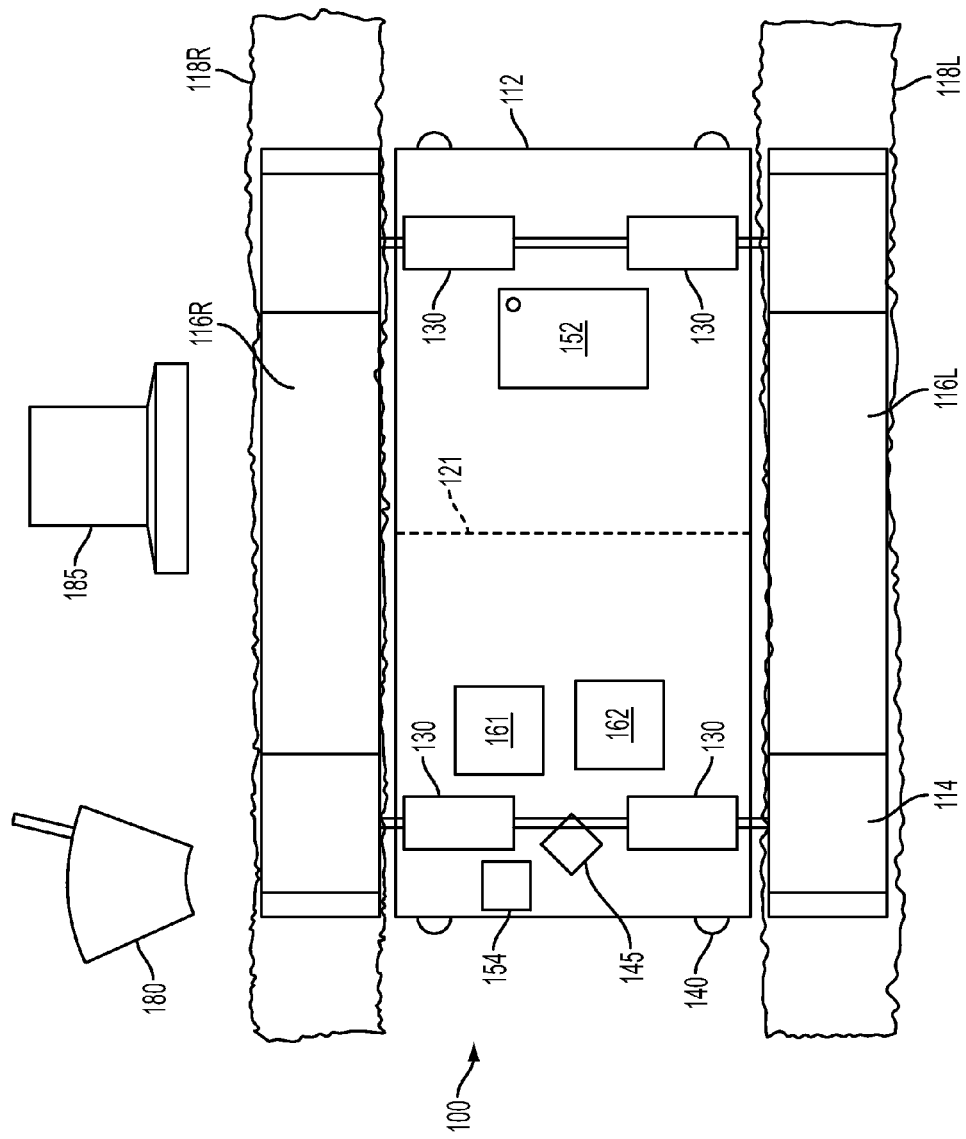

FIG. 5 is an illustration of a plan view of a vehicle supported by tracks and partially collapsible treads, along with a remote console and a remote computer, according to particular embodiments.

Figure 6:
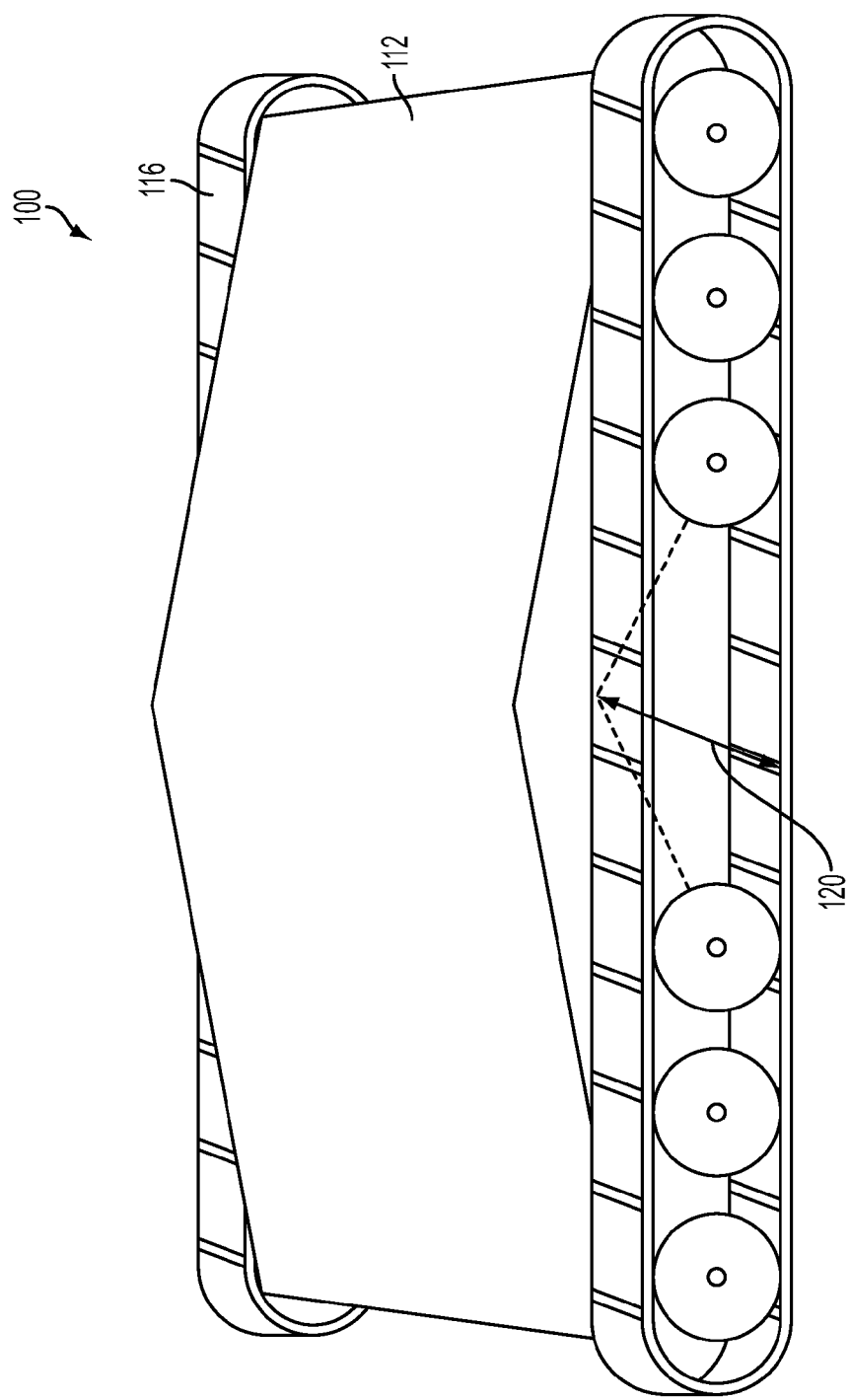

FIG. 6 is a perspective illustration of a vehicle supported by tracks, according to particular embodiments.

Figure 7:
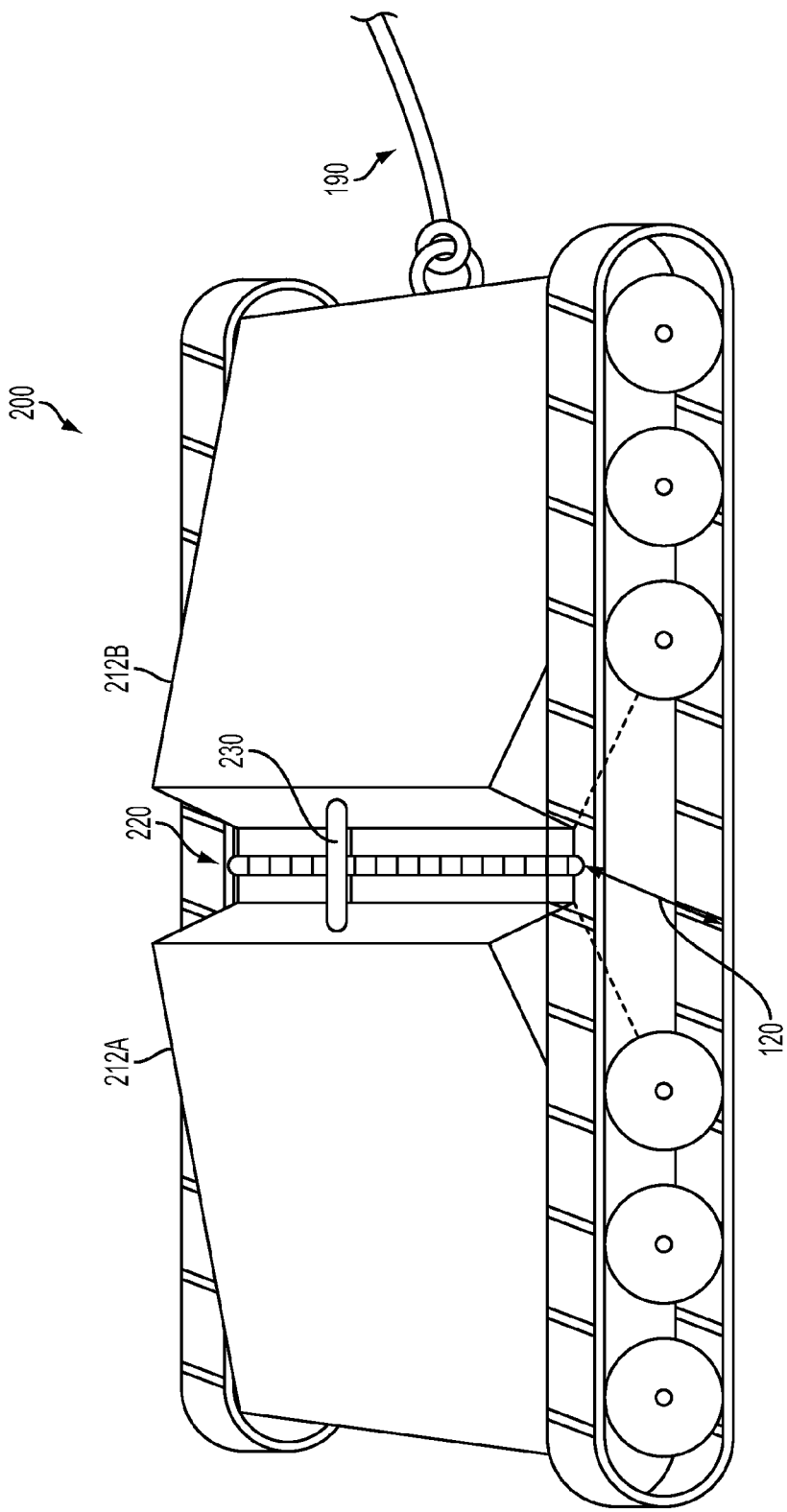

FIG. 7 is a perspective illustration of a vehicle, according to a second embodiment.

Figure 8:
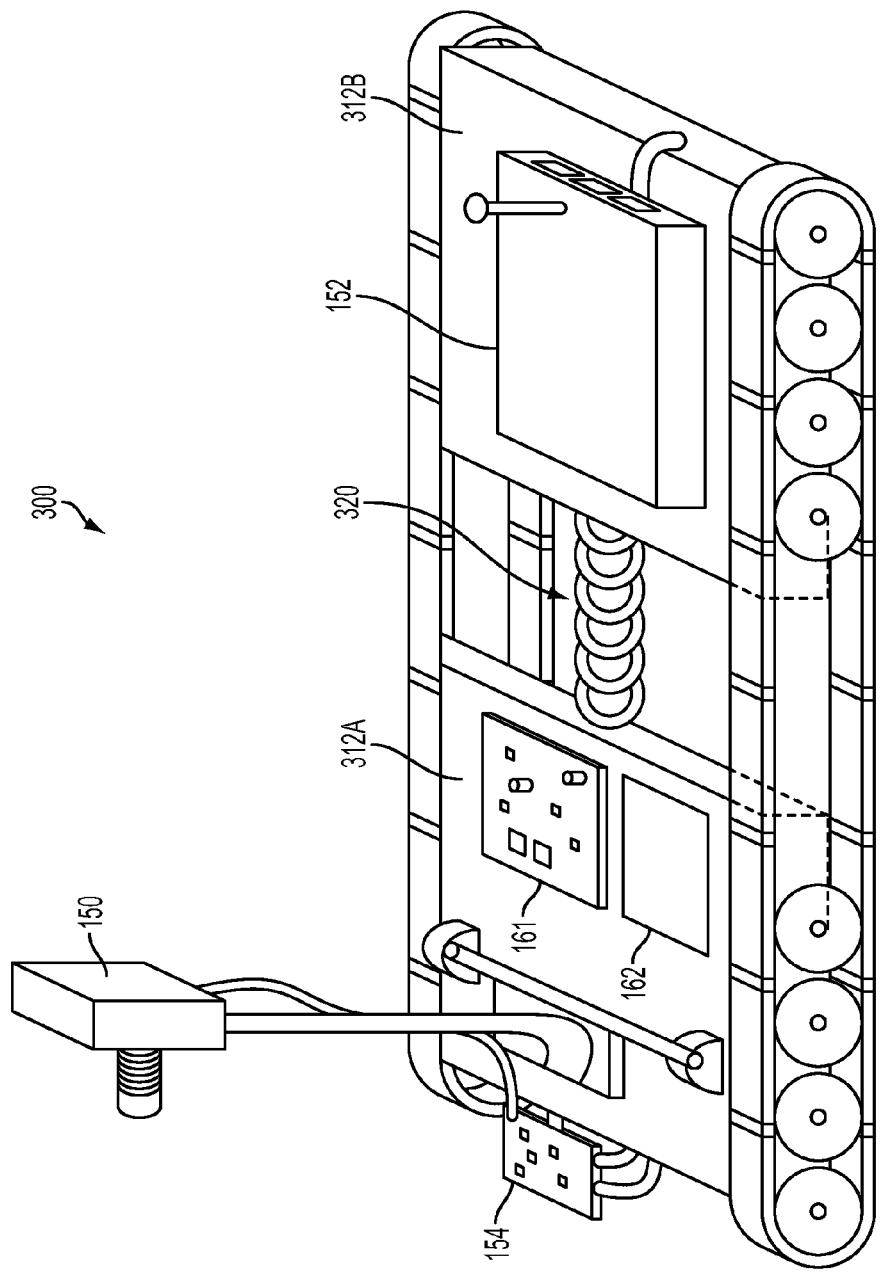

FIG. 8 is a perspective illustration of a vehicle, according to a third embodiment.

Figure 9:
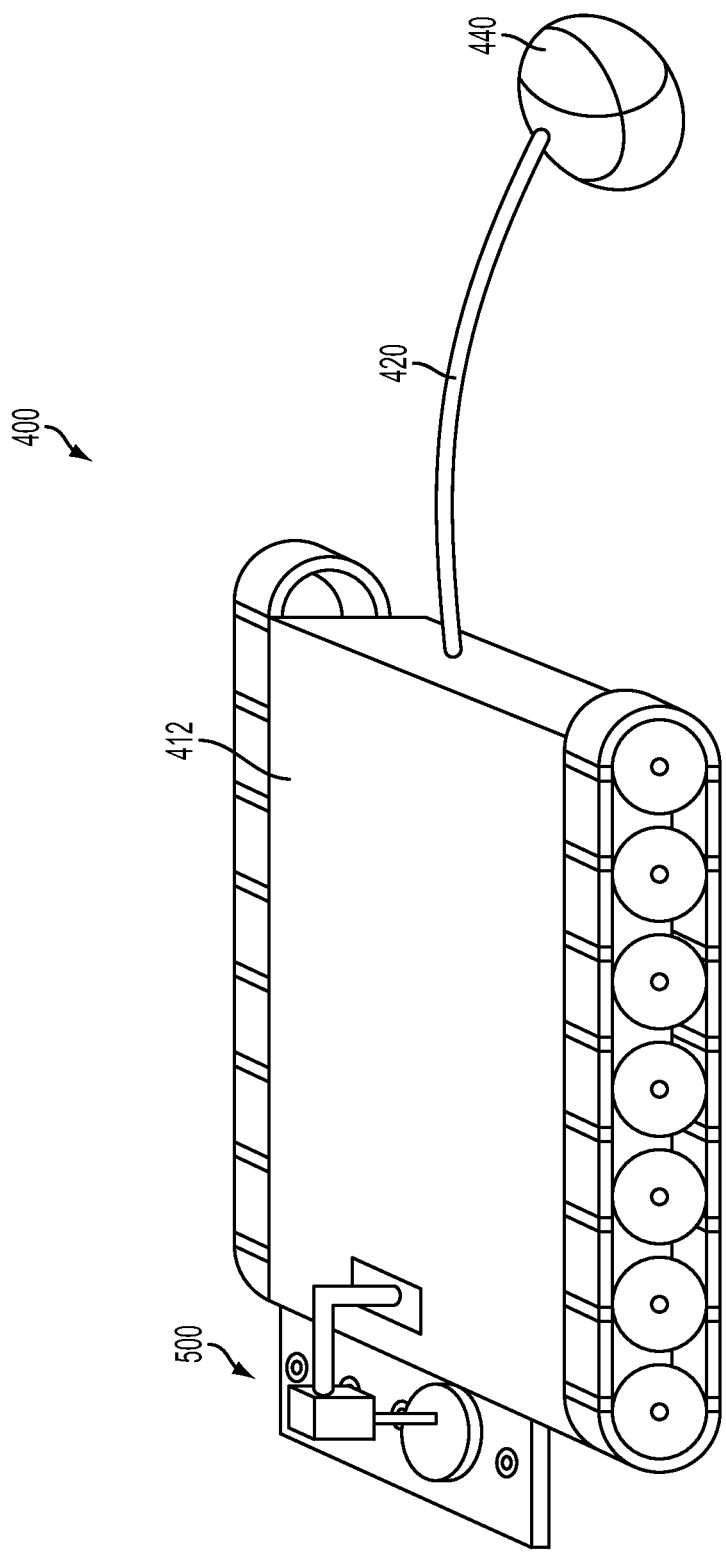

FIG. 9 is a perspective illustration of a vehicle, according to a fourth embodiment.

Figure 10:
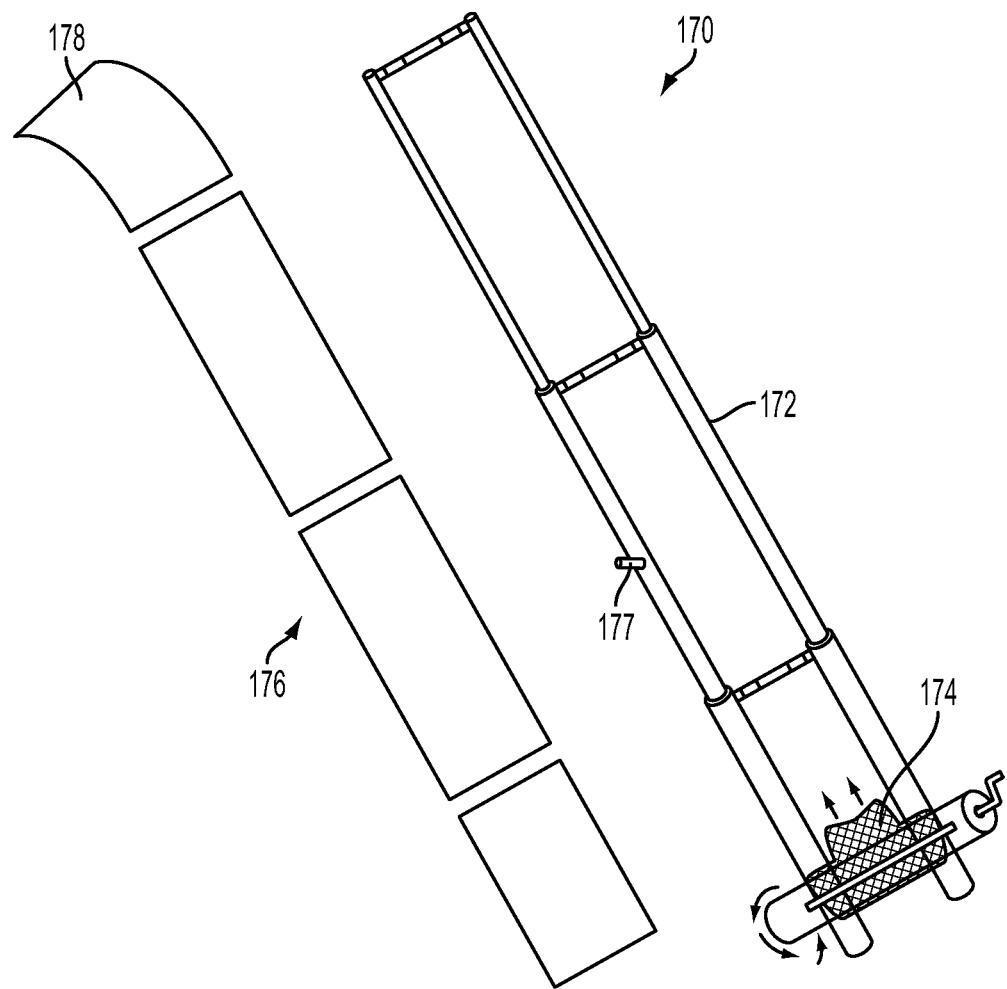

FIG. 10 is a perspective, partially exploded illustration of a lift system for a vehicle, according to particular embodiments.

Figure 11:
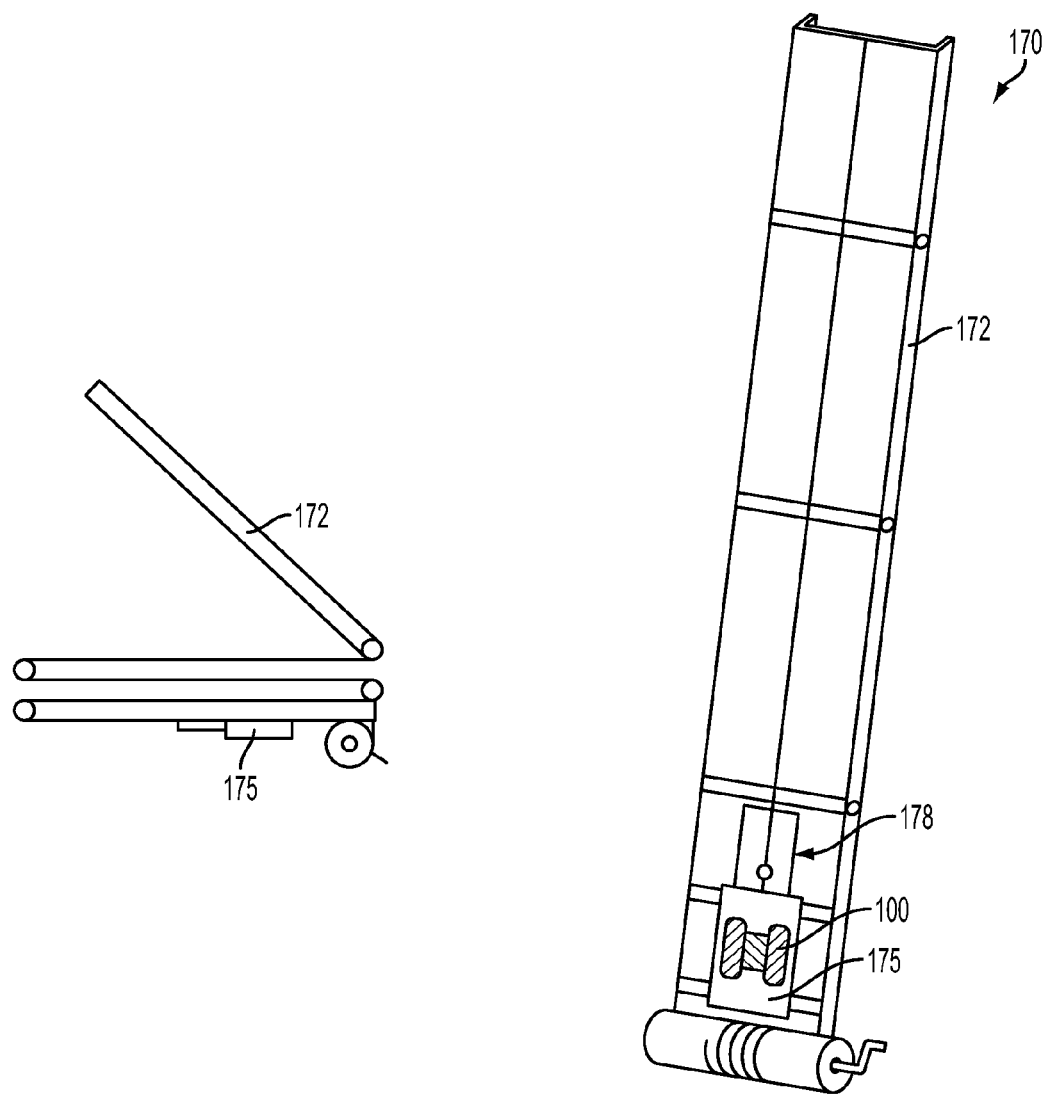

FIG. 11 is a pair of perspective illustrations of a lift system for a vehicle, according to an alternative embodiment.

Figure 12:
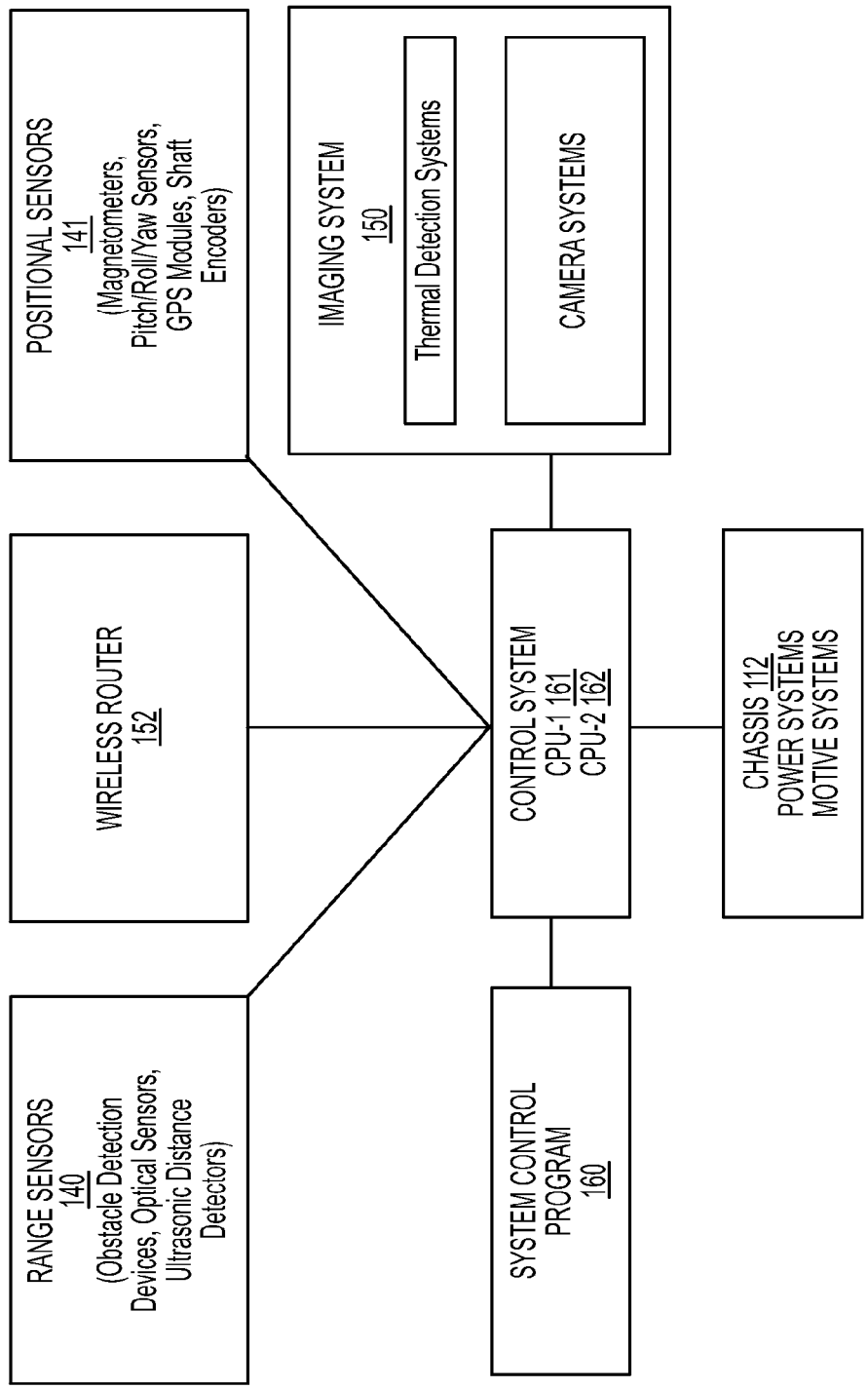

FIG. 12 is a system hardware diagram, according to particular embodiments.

FIGS. 13 through 25 are flow charts describing various routines in a system control program, according to particular embodiments.

DETAILED DESCRIPTION

The present systems and apparatuses and methods are understood more readily by reference to the following detailed description, examples, drawing, and claims, and their previous and following descriptions. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching in its best, currently known embodiment. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are a part of the invention described. Thus, the following description is provided as illustrative of the principles of the invention and not in limitation thereof.

As used throughout, the singular forms "a," "an" and "the" include plural referents unless the context clearly dictates otherwise. Thus, for example, reference to "a" component can include two or more such components unless the context indicates otherwise. Also, the words "proximal" and "distal" are used to describe items or portions of items that are situated closer to and away from, respectively, a user or operator. Thus, for example, the tip or free end of a device may be referred to as the distal end, whereas the generally opposing end or handle may be referred to as the proximal end.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Vehicle

According to a particular embodiment, a vehicle adapted for traversing and inspecting an irregular terrain, such as a roof, includes a chassis, a motive system, a power system, an imaging system, a sensor system, and a control system. Optionally, the vehicle may include an impression system for taking and recording a physical impression or imprint of an area of interest.

In one type of use, the vehicle may be placed on the roof of a building to traverse and inspect the condition of the roof. The control system may include an autonomous mode with a guidance program and/or a manual mode with a remote console with user interface controls for directing the vehicle from a location remote from the roof.

Chassis

The chassis in particular embodiments is sized and shaped to traverse steep slopes and cross abrupt pitch changes such as roof peaks without damaging or overturning the vehicle.

As shown in FIG. 1, a vehicle 100 according to a first embodiment includes a chassis 112 supported by a pair of flexible, continuous tracks (left track 116L is shown) mounted on opposing left and right sides of the chassis. Each track is engaged with at least one driven sprocket 114 and at least one free sprocket or idler 115. The chassis 112 has opposing front and rear ends, an upper deck and a generally opposing bottom surface. In various embodiments, the bottom surface defines a relatively low ground clearance. The low ground clearance helps keep the vehicle's center of mass low (sometimes called the "center of gravity"), which helps prevent the vehicle from overturning when traversing irregular terrain. The center of mass, or barycenter, may be defined as the weighted average location of all the mass particles of a body.

The bottom surface defines a first clearance 110 near the front end, as shown in FIG. 1. The clearance may be similar near the rear end. The bottom surface also defines a second clearance 120 at an intermediate location, which may or may not be near the center of mass, or near the lengthwise midpoint, of the chassis 112. The second clearance 120 may be described as lying along an intermediate, substantially transverse axis 121 (shown in FIG. 5) relative to the longitudinal axis of the chassis 112. As shown, the second clearance 120 is substantially greater than the first clearance 110, where the clearances are measured relative to a substantially planar surface 10. A perspective view of a vehicle 100 is illustrated in FIG. 6. As shown, the chassis 112 is supported by tracks 116 and the second clearance 120 is located at an intermediate location relative to the front and rear ends of the chassis 112. As illustrated, the bottom surface of the chassis 112 has a fixed camber angle where the second clearance 120 is located.

In one exemplary embodiment, the vehicle is about 20.5 inches long, 15 inches wide, and 5 inches high at the top of the chassis. The lens assembly 156 is positioned at a height of about 8 inches. The first clearance 110 in this embodiment is 0.25 inches, and the second clearance is 1.00 inch. Accordingly, in this embodiment, the second clearance is about four times greater than the first clearance.

Several alternative embodiments of the chassis preserve the general relationship of the first clearance 100 to the second clearance 120. For example, a second embodiment of the vehicle 200 is illustrated in FIG. 7. As shown, the chassis includes a fore sub-chassis 212A and a rear sub-chassis 212B connected by one or more hinges 220. The motion of the two sub-chassis 212A, 212B about the hinges 220 may be limited by one or more limiters 230. The hinges 220, as shown, may lie along an intermediate, substantially transverse axis relative to the longitudinal axis of the chassis. The second clearance 120 may be located at or near the hinges 220. In an alternative embodiment that is not limited to the particular chassis configuration illustrated in FIG. 7, the vehicle may also include an attachment point for an auxiliary rope 190. The vehicle may be used to maneuver the rope 190 around a supporting feature on the roof, such as a chimney. Once secure, the free end of the rope 190 may be used to assist a person in climbing onto the roof and/or provide a safety precaution while a person is walking on the roof.

Another alternative embodiment of the chassis also preserves the general relationship of the first clearance 100 to the second clearance 120. A third embodiment of the vehicle 300 is illustrated in FIG. 8. As shown, the chassis includes a first sub-chassis 312A and a second sub-chassis 312B connected by one or more springs 320. The motion of the two sub-chassis 312A, 312B about the springs 320 may be limited by one or more limiters (not shown). The springs 320, as shown, may lie along or parallel to the longitudinal axis of the chassis. The springs 320 may allow both linear and rotational motion between the two sub-chassis in all three directions. The second clearance 120 may be located at or near the springs 320, as shown, where there is no bottom surface of any chassis element to limit the height of the second clearance.

A fourth embodiment of the vehicle 400 is illustrated in FIG. 9. As shown, the chassis 412 is unitary, with no sub-chassis elements or apparent camber to the bottom surface. The vehicle 400 includes a counterweight 440 separated from the chassis 412 and attached to a tether 420. In this alternative embodiment, the tracks may be substantially rigid instead of flexible, and the tracks may or may not include a partially collapsible tread. The counterweight 440 provides stability in a variety of situation, including when the vehicle 400 crosses a peak. In an alternative embodiment that is not limited to the particular chassis configuration illustrated in FIG. 9, the vehicle may also include an impression system 500, which is described in greater detail below.

Power System

The vehicle in various embodiments includes a power system for providing energy to all the onboard systems. The power system may include one or more batteries, replaceable and/or rechargeable, and configured to cooperate with and deliver power to the various onboard systems described herein.

Motive System

The motive system in one embodiment includes a track system similar to a military tank or a tracked construction vehicle. As described briefly above and shown in FIG. 1, the chassis 112 is supported by a pair of flexible, continuous tracks 116 mounted on opposing sides of the chassis 112. Each track 116 is engaged with at least one driven sprocket 114 that, when rotated, imparts motion to the track 116 and to the vehicle 100. The tracks 116L, 116R (left and right) may be made of elastomeric material such as rubber, for flexibility, adhesion and good traction.

As shown in FIG. 5, the motive system in one embodiment includes one or more drive motors 130 connected to and engaged with one of the driven sprockets 114. In the embodiment illustrated in FIG. 5, there are four drive motors 130, each one engaged with a driven sprocket. Each track 116L, 116R, may be driven independently by one or more motors. Independent motor control facilitates tight-radius turns and precise navigation around obstacles.

As shown in FIG. 2, the motive system in one embodiment also includes a partially collapsible tread (left tread 118L is shown) that is attached along the length of each track (left track 116L is shown). The partially collapsible treads 118L, 118R are also illustrated in plan view in FIG. 5.

Many who are unfamiliar with the field of roofing and roof inspections do not realize that most roof surfaces are extremely abrasive. For example, a simple rubber wheel would quickly deteriorate and fall apart after simply rolling across asphalt shingles a number of times. For such a hostile surface, the partially collapsible treads 118L, 118R provide better durability, flexibility, adhesion, and improved traction relative to other types of treads. In one exemplary embodiment, the partially collapsible treads 118L, 118R are between 1 and 2 inches thick, and are made of a cellular foam rubber material. In one embodiment, the treads 118L, 118R include a selectively releasable adhesive layer on one side, to allow quick and easy replacement with new treads in the field, whenever necessary.

The treads 118L, 118R are partially collapsible, which means of course that the material will collapse or compress in response to a force, and then expand when such a force is removed. For example, the left tread 118L as shown in FIG. 2 is positioned lengthwise along the left track 116L, and the vehicle 100 is not located on a surface of any kind. The left tread 118L is generally expanded, fully and relatively evenly, around the entire perimeter of the left track 116L. In FIG. 3, however, when the vehicle 100 is placed on a surface, the left tread 118L partially collapses against the surface in response to the weight of the vehicle 100.

In addition to providing better durability and improved traction, the treads 118L, 118R cooperate with the relatively low ground clearances 110, 120 (shown in FIG. 1) in order to keep the vehicle 100 stable when traversing steep slopes, crossing abrupt pitch changes, or otherwise traveling on irregular terrain. For example, as illustrated in FIG. 4, the vehicle 100 is crossing the peak 20 of a roof or other structure. As shown, the peak 20 urges the flexible left track 116L—and the partially collapsible left tread 118L—toward the bottom surface of the chassis 112 near the second clearance 120. Both the relatively high second clearance 120 and the flexibility of the partially collapsible left tread 118L help the vehicle 100 maintain a low center of mass relative to the peak 20 during this maneuver. By keeping low relative to the peak 20, the vehicle 100 is less likely to overturn. Also, the partially collapsible left tread 118L remains generally expanded—and in contact with the surface—on both sides of the peak 20. In this aspect, the expandability of the left tread 118L helps the vehicle 100 maintain good traction with the surface during such a maneuver. By improving traction at the peak 20, the vehicle 100 is less likely to overturn.

Imaging System

The imaging system 150 in particular embodiments may be configured to provide still images and/or video, mono or stereo, transmitted in real-time and/or recorded on accessible media for later retrieval and analysis.

As shown schematically in FIG. 1, the imaging system 150 in one embodiment includes a main imaging assembly 154, a lens assembly 156, and a wireless router 152. Unlike most imaging systems, the lens assembly 156 is separated from the main imaging assembly 154 and mounted above the chassis 112 on a pole or other suitable structure. The lens assembly 156 is mounted relatively high in order to capture high-quality images of the roof surface. The main imaging assembly 154, which contains the heavier components and system elements, is mounted lower, on or near the chassis 112, in order to help keep the vehicle's center of mass low. In this aspect, the separation of elements of the imaging system 150 helps the vehicle 100 maintain good traction when traversing steep slopes or crossing the peak 20 of a roof, as illustrated in FIG. 4.

The main imaging assembly 154 may be connected via a network cable to a wireless router 152, which may be mounted to the chassis 112, as shown in FIG. 1. In this embodiment, the wireless router 152 is dedicated to transmitting the images or data from the vehicle 100 to a remote computer 185 (FIG. 5), where a user or operator may view a video stream of the captured images, in real-time, during an inspection.

The imaging system 150 may include its own onboard data storage and/or it may be connected to the other onboard systems where the images or data can be stored for later use. In this aspect, the camera system makes a persistent visual record of the subject roof, thereby allowing people and companies with potentially competing interests the opportunity to review an objective record of the roof condition.

If the imaging system 150 includes a pair of cameras, the cameras will be synchronized in order to produce accurate stereographic images. Stereographic images may also be created virtually, by using select images from a single camera. Use of stereographic imaging apparatus will facilitate the later technical analysis of the images and should allow detection of the size and shape of roof features, such as the dents caused by hail. For example, hail makes a characteristically somewhat hemispherical depression, while minor heat blistering produces a raised area like a bubble. Closed heat blisters make a bubble in the granules of the shingle. Open heat blisters expose the underlying mat of the shingle.

The imaging system 150 may also include thermal or heat-sensing systems for detecting areas of trapped moisture, areas of heat loss (suggesting poor insulation). Detecting the heat signature from a roof can produce, for example, a map of the relative heat loss taking place in different areas of the roof.

Sensor System

The sensor system in particular embodiments may include positional sensors 141 for location and navigation, and range sensors 140 for sensing various features on a roof, such as obstacles and roof edges.

The positional sensors 141 may include a digital compass for sensing the vehicle's position, orientation, and heading relative to the earth. For example, the vehicle may include onboard a Honeywell HMC5843 digital compass with three-axis magneto-sensitive sensors and an application-specific integrated chip with an interface for communicating with other systems.

The positional sensors 141 may also include a sensor for measuring pitch, roll, and yaw. For example, the vehicle may include onboard an InvenSense ITG-3200 integrated three-axis angular-rate sensors (gyroscopes) with digital output for communicating with other systems.

The positional sensors 141 may also include a GPS module for determining the vehicle's position relative to the satellites in the Global Positioning System. For example, the vehicle may include onboard a U-Blox LEA-5H GPS receiver module with a built-in antenna, a built-in Flash memory, and an interface for communicating with other systems.

The positional sensors 141 may also include one or more distance-measuring sensors configured to precisely measure the distance traveled by the vehicle. For example, the vehicle may include onboard an optical shaft encoder 145 such as an incremental 1000-line shaft encoder, which senses the number of revolutions of a shaft (such as an axle), which can then be converted into the linear distance traveled by the vehicle. In FIG. 5, an optical shaft encoder 145 is shown, schematically, in position near a front axle of the vehicle 100.

The range sensors 140 may include any of a variety of suitable sensors, such as optical sensors, ultrasonic sensors, or radio-frequency sensors. For example, the vehicle may include onboard an ultrasonic range sensor such as the Parallax Ping ultrasonic distance detector that measures distances using sonar and interfaces with micro-controllers for communicating with other systems.

In one embodiment, the vehicle 100 is equipped with eight (8) ultrasonic range sensors 140, positioned near the outboard edges of the vehicle 100 and directed in all three axis directions (x, y, z) in order to sense the surrounding environment in all three dimensions.

Control System

As shown in FIG. 12, the control system in various embodiments is connected to essentially all the other onboard systems. The control system in one embodiment includes a first microcontroller 161, a system control program 160, and a second microcontroller 162. The control system may also include a remote console 180 with its own user interface controls and a wireless transmitter. The control system, as shown in FIG. 12, is also connected to the imaging system 150 and its wireless router 152, and to the sensor systems, including the range sensors 140 and positional sensors 141.

The control system, generally, includes a guidance routine that causes the vehicle to traverse the roof surface in a predetermined manner, using the onboard sensor systems to avoid collisions with obstacles and to avoid falling off the roof edges.

CPU2: In one embodiment, the second microcontroller 162 (called CPU2) may include a customized printed circuit board (PCB) that runs a software loop to execute the following tasks.

1. Take a distance reading from each of the ultrasonic range sensors 140, in sequence, one after the other. A distance reading involves issuing a stimulus pulse to the sonar being interrogated, then measuring the width of the pulse that the sonar sends back. The width is directly correlated with the speed of sound and is used to calculate the representative distance of any obstacle, in any direction (i.e., ahead or behind, left or right, above or below).

2. Store the distance data from each sensor 140 in onboard memory, resident in CPU2 162.

3. Take a pitch and roll reading from the digital gyroscope, which is one of the positional sensors 141 described above, and store the values in onboard memory. In this embodiment, the chip in CPU2 162 has its own communications protocol and command set for reading the values it receives from any of the sensors 140, 141. The CPU2 162 communicates with the chip via a connection called I2C-bus.

4. Take a compass heading reading from the magnetometer (digital compass), which is also one of the positional sensors 141 described above, and store the values in onboard memory.

5. Read the incoming signals from the remote control console 180. In various embodiments, the control system includes a remote console 180 with its own user interface controls and a wireless transmitter for sending signals to the onboard control system. In one embodiment, CPU2 162 includes or is in communication with a multi-channel receiver located onboard the vehicle, and paired with a remote transmitter positioned in a remote control console 180. For example, the vehicle may include onboard a Futaba R617FS 2.4 GHz FASST seven-channel receiver, paired with a Futaba 7C seven-channel transmitter positioned in the remote control console 180. In one embodiment, CPU2 162 is configured to read the incoming signals from the remote console 180 on each of several receiver channels, obtaining the current pulsewidth of the signal. The pulsewidth of the signal varies according to the position of the channel's associated joystick (gimbal) or switch position located on the remote console 180. In one embodiment, one of the onboard receivers sends a digital pulse several times a second, and has a pulsewidth of about 1.0 to 2.0 milliseconds. The signals from the remote console 180 are received by CPU2 162 and processed using software and various timers on the CPU2 162.

6. Store the incoming pulsewidths from the remote console 180 in onboard memory.

7. Interrogate the first microcontroller 161 (called CPU1) to determine if CPU1 161 has issued any instructions (e.g., right motor on, left motor off) and, if so, execute those instructions.

In a preferred embodiment, the onboard processing is distributed between CPU1 161 and CPU2 162 in order to facilitate the smooth and timely operation of the vehicle 100. For example, in one embodiment, CPU1 161 is primarily dedicated to making decisions (using the system control program 160, for example), whereas CPU2 162 is primarily dedicated to gathering sensor data and remote control signals. Other existing robotic systems that rely on a single onboard computer to both gather data and process instructions would be overwhelmed and "freeze" in response to the myriad of slopes, obstacles, and edges that are typically encountered on a roof. The solution described herein includes distributed processing between two processors, CPU1 161 and CPU2 162.

8. Interrogate the first microcontroller 161 (called CPU1) to determine if CPU1 161 has issued any request for data (e.g., get compass heading, get GPS location) and, if so, retrieve the requested data from the CPU2 onboard memory and send the requested data to CPU1.

9. Return to task 1 above and repeat, in a continuous loop.

CPU1: In one embodiment, the first microcontroller 161 (CPU1) also runs a software loop to execute its own set of tasks.

1. Request from CPU2 the latest distance readings from each of the ultrasonic range sensors 140.

2. Determine (calculate) if any of the distances represent an obstacle or a fall point (e.g., a hole or the edge of the roof) that should be avoided.

(a) If the vehicle is not moving, then no action is required, and no signal needs to be sent to CPU2.

(b) If the vehicle is moving and is operating in autonomous mode (called 'auto-nav'), then evasive action is required, and CPU1 sends a signal to CPU2 to take evasive action by turning away from the hazard. After the CPU2 readings indicate no hazard, the CPU1 sends a signal to CPU2 to stop the evasive maneuver.

(c) If the vehicle is moving and is operating in manual mode (called 'manual-nav'), then evasive action is required, and CPU1 sends a signal to CPU2 to stop—forcing the vehicle to stop, even if the operator holding the remote console is sending a contrary signal. This is called the emergency override condition. The vehicle remains stopped until the operator throws an assigned switch on the remote console, telling CPU1 to release control of the motors back to the operator (until another hazard is encountered).

3. Send a query to CPU2 to determine whether the operator has placed the vehicle in 'atuo-nav' or 'manual-nav' mode. This is accomplished by querying the pulsewidths of the receiver channels associated with the dedicated navigation mode switches on the remote console.

4. In autonomous mode (auto-nav), CPU1 may be configured to execute the following navigation routine. (a) Send a signal to CPU2 with instructions to activate one or more of the drive motors and move forward, and slightly right, at a given speed. (b) Monitor the incoming data from CPU2 from the range sensors 140, constantly evaluating whether an obstacle or fall hazard is present. (c) If a hazard is detected on the right side, then the control system assumes the vehicle has reached a perimeter boundary. (d) Take a heading, pitch, and roll reading from CPU2 and reset a distance counter to zero. (e) Begin a turn toward the left in order to avoid the hazard ahead on the right; begin measuring pulses from the optical shaft encoder 145 (FIG. 5) and accumulate the count in onboard memory. (f) After the vehicle has turned away from the hazard, begin moving forward, and slightly right, at a given speed until another hazard or boundary is encountered. (g) When a hazard is detected in center-front or left-front, CPU1 instructs CPU2 to stop the vehicle and store all the data (heading, pitch, roll, and now distance) into a memory structure in an EEPROM chip located on the CPU board. Then, the vehicle is directed to execute a pivot turn, left, until the current hazard is no longer detected. (h) Return to step (a) and repeat. This will move the vehicle counter-clockwise around the surface of the roof until the operator pushes an assigned switch on the remote console that instructs CPU1 to stop the vehicle and store all the relevant data in the onboard EEPROM chip (including, for example, the current GPS coordinates and the current GPS time and date). The data stored may also include information entered by the operator (e.g., job number, roof section number) using the user interface on the remote console.

5. In manual mode (manual-nav), the operator holding the remote console 180 is responsible for moving the vehicle about the roof surface. In one embodiment, the remote console 180 is equipped with its own user interface and input devices, such as one or more push buttons, switches, and joysticks (on gimbal mounts). For example, the remote console 180 may include a Futaba 7C seven-channel transmitter that is paired with a Futaba R617FS 2.4 GHz FASST seven-channel receiver that is in communication with CPU2. In one embodiment, gimbals on the remote console 180 are used to send signals instructing one or more of the drive motors to activate and move the vehicle in a desired direction. Any of the switches on the remote console may be assigned to a particular task. For example, a switch can be assigned to tell CPU1 to begin a new distance measurement, as described in step 4(d) above. Another switch can be assigned to tell CPU1 to store the distance measurement, as described in step 4(g) above. When the operator has finished traversing the roof, or a particular section, another switch tells CPU1 to store all the relevant data, as described in the final step, above.

6. While in manual-nav mode, the only automatic or autonomous feature of the vehicle and its onboard systems is the emergency override condition described in 2(b), above.

7. The operator does not need to measure any part of the roof. The vehicle and its onboard systems may be configured to measure distances as well as the roof pitch and the size and shape of various obstacles. The onboard imaging system may be used to record video and/or route a live video stream to a remote computer on the ground.

8. If and when measurement data has been stored, CPU1 161 may be configured to support a serial communications protocol by which a remote computer can be connected to the CPU board using a USB cable, and the stored data may be downloaded for analysis. In one embodiment, all the data from each and every segment of the roof traversed by the vehicle may be stored and downloaded. The data for each segment, for example, may include the compass heading, pitch, roll, time, date, and distance traveled. This data may be combined into a virtual outline of the roof, showing the path traveled by the vehicle. Subsequent analysis of the combined data may be used to calculate the total area, average pitch, and other characteristics of the surface.

FIGS. 13 through 25 are flow charts describing various routines in the system control program 160, according to particular embodiments.

Figure 13:
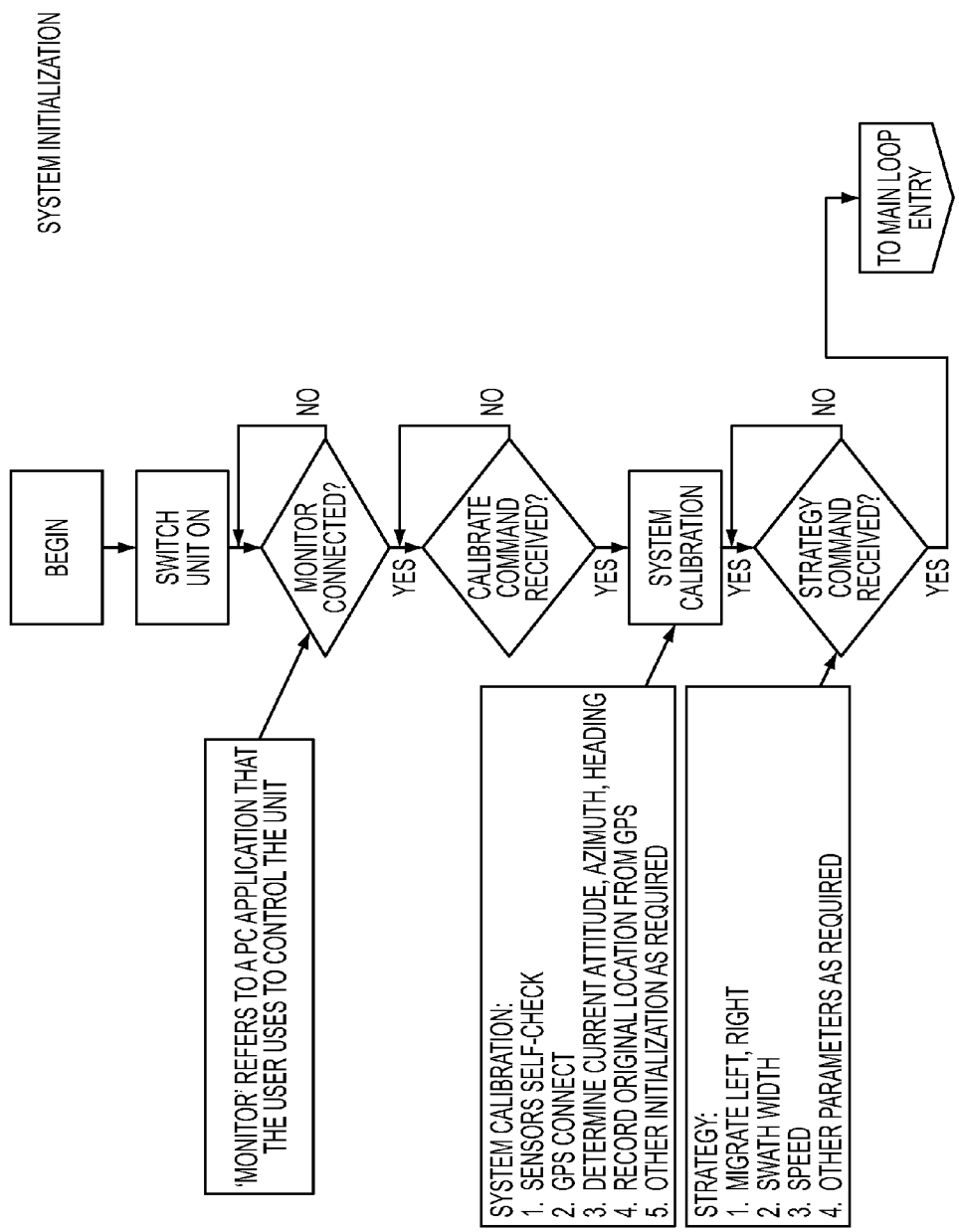

FIG. 13 is a flow chart describing the system initialization, in one embodiment. The term monitor refers to a remote computer 185 (shown in FIG. 5) which may be used to receive a streaming video feed from the vehicle. The system calibration steps may include a self-check by the sensors 140, 141, a connection to the GPS module, an initial determination of the vehicle's altitude, azimuth, and heading, an initial record of the GPS location, and any other initialization procedures required for any component. The strategy command, in one embodiment, may include a command to migrate left or right, to cover a swath of a certain width, to proceed at a predetermined speed, and/or any other commands in accordance with parameters established by the system or its operators.

Figure 14:
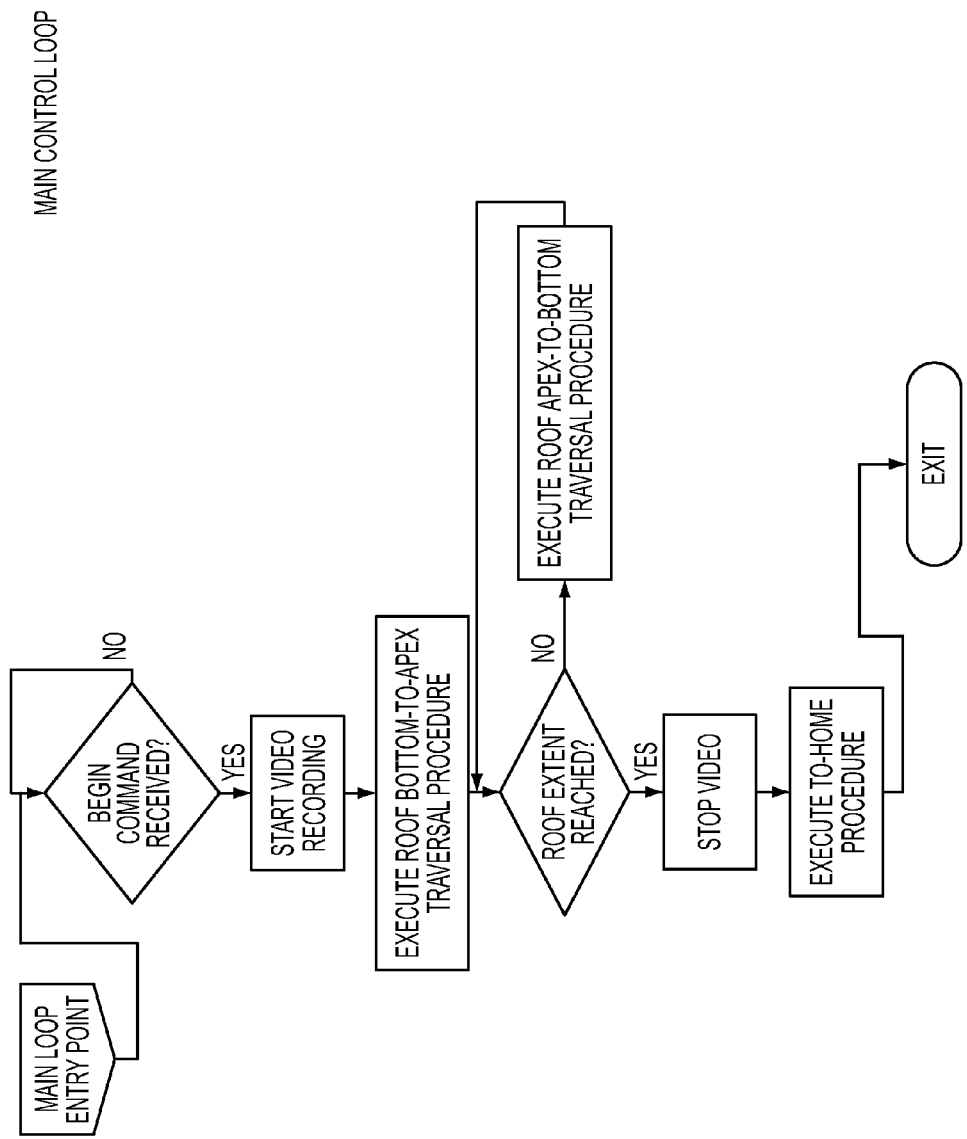

FIG. 14 is a flow chart describing the main control loop, in one embodiment. The main control loop, as shown, includes the execution of a number of distinct routines or procedures, as described in the other figures.

Figure 15:
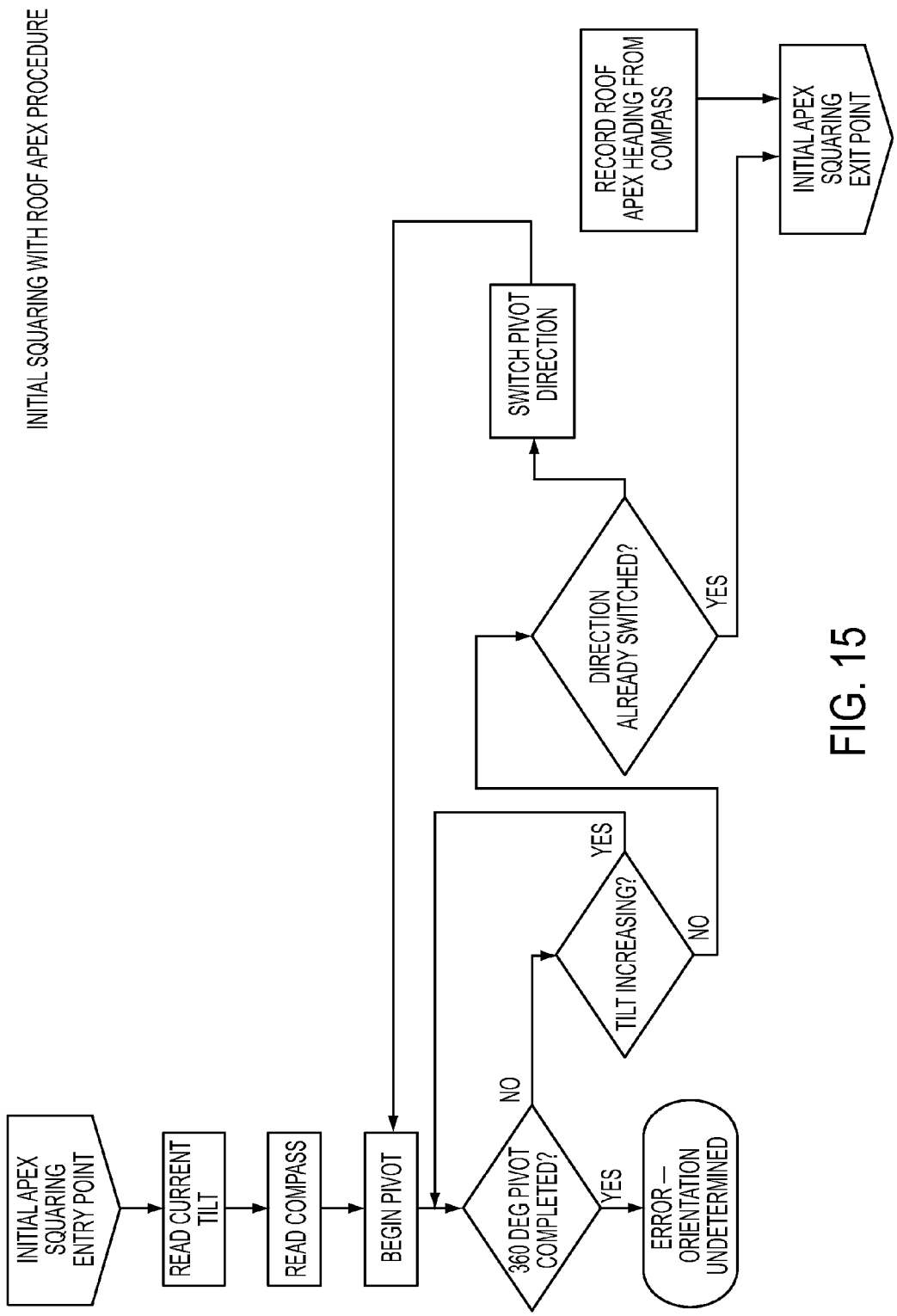

FIG. 15 is a flow chart describing a procedure called "initial squaring with roof apex," in one embodiment.

Figure 16:
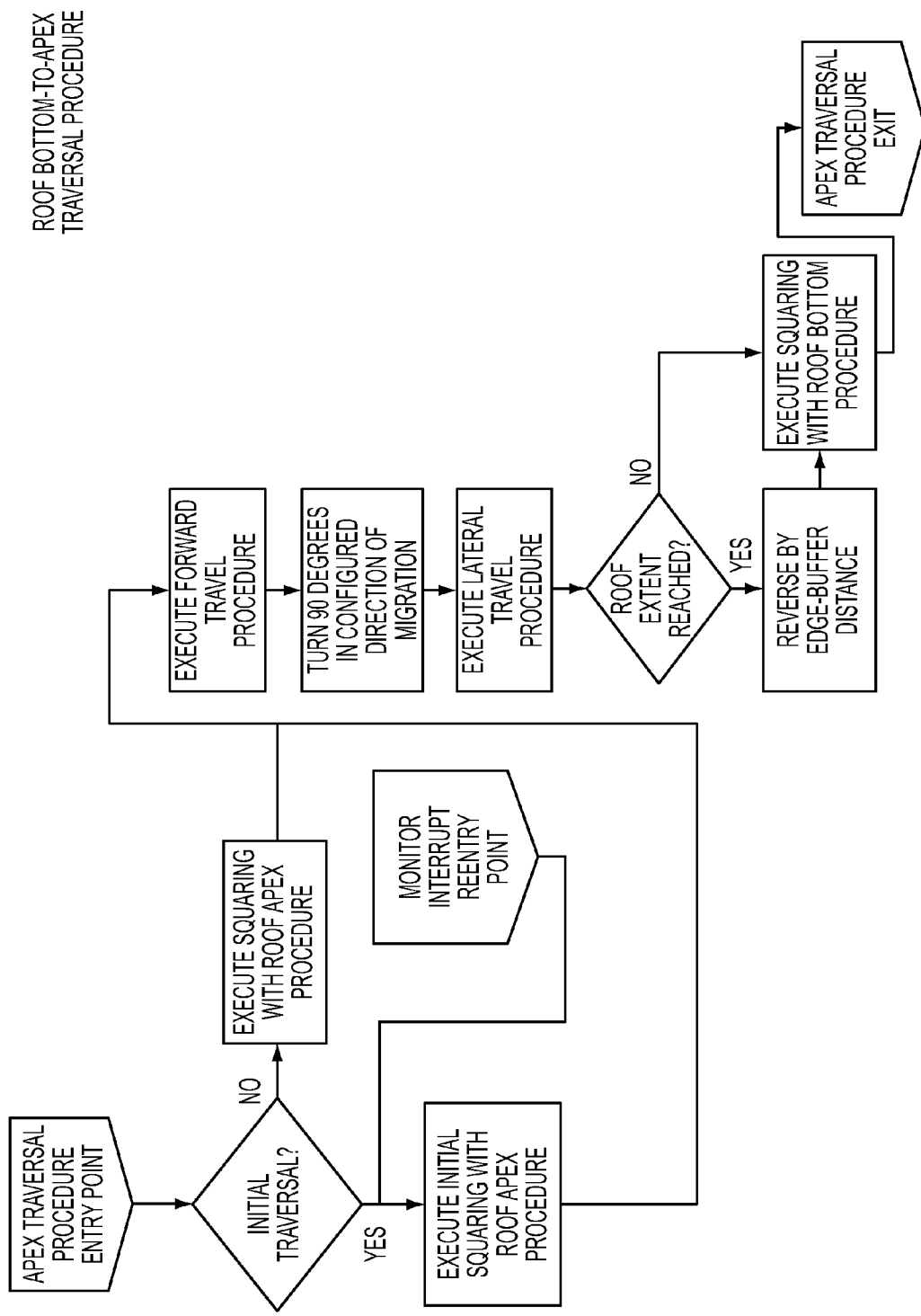

FIG. 16 is a flow chart describing a procedure called "roof bottom to apex traversal," in one embodiment.

Figure 17:
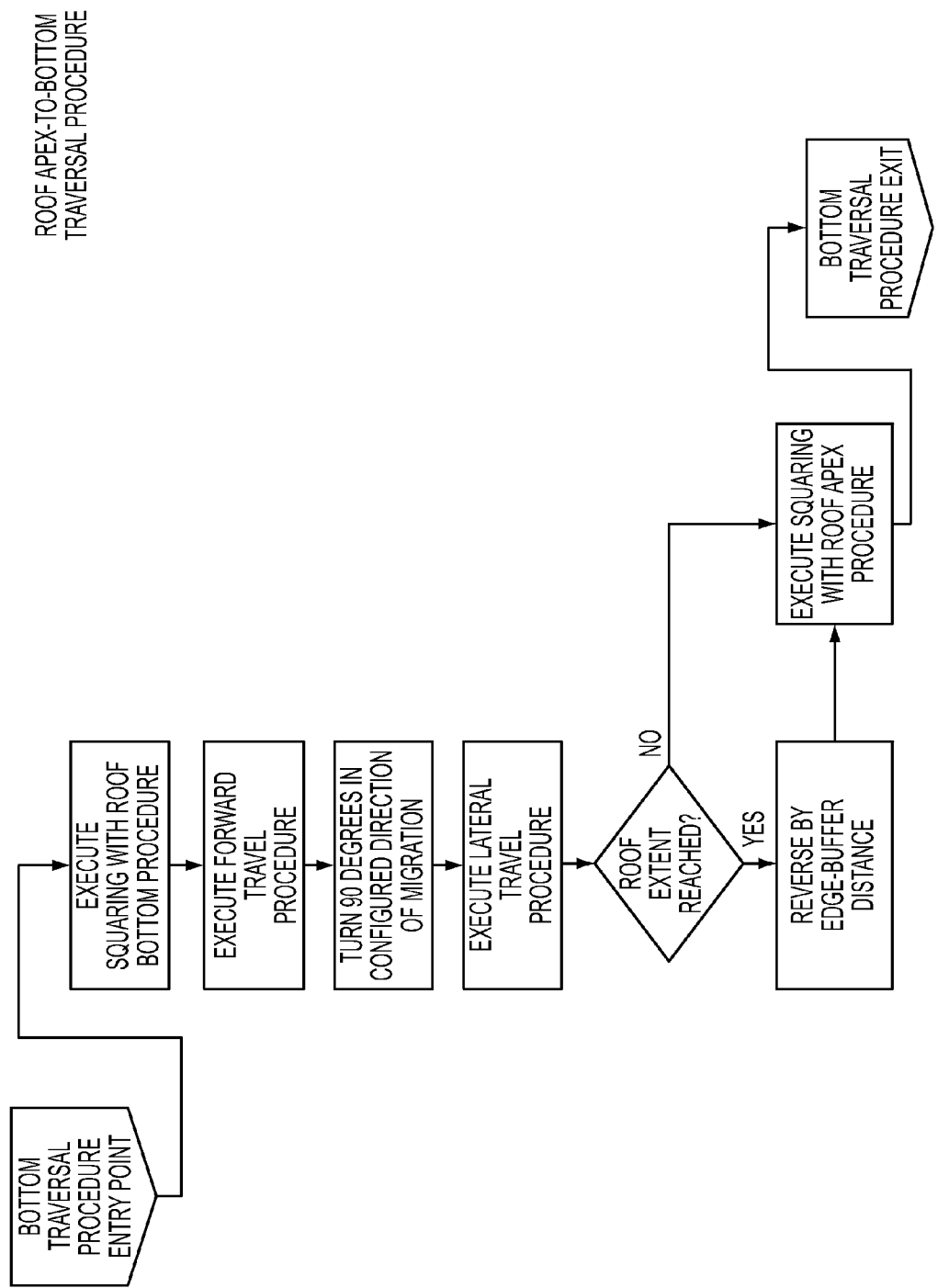

FIG. 17 is a flow chart describing a procedure called "roof apex to bottom traversal," in one embodiment.

Figure 18:
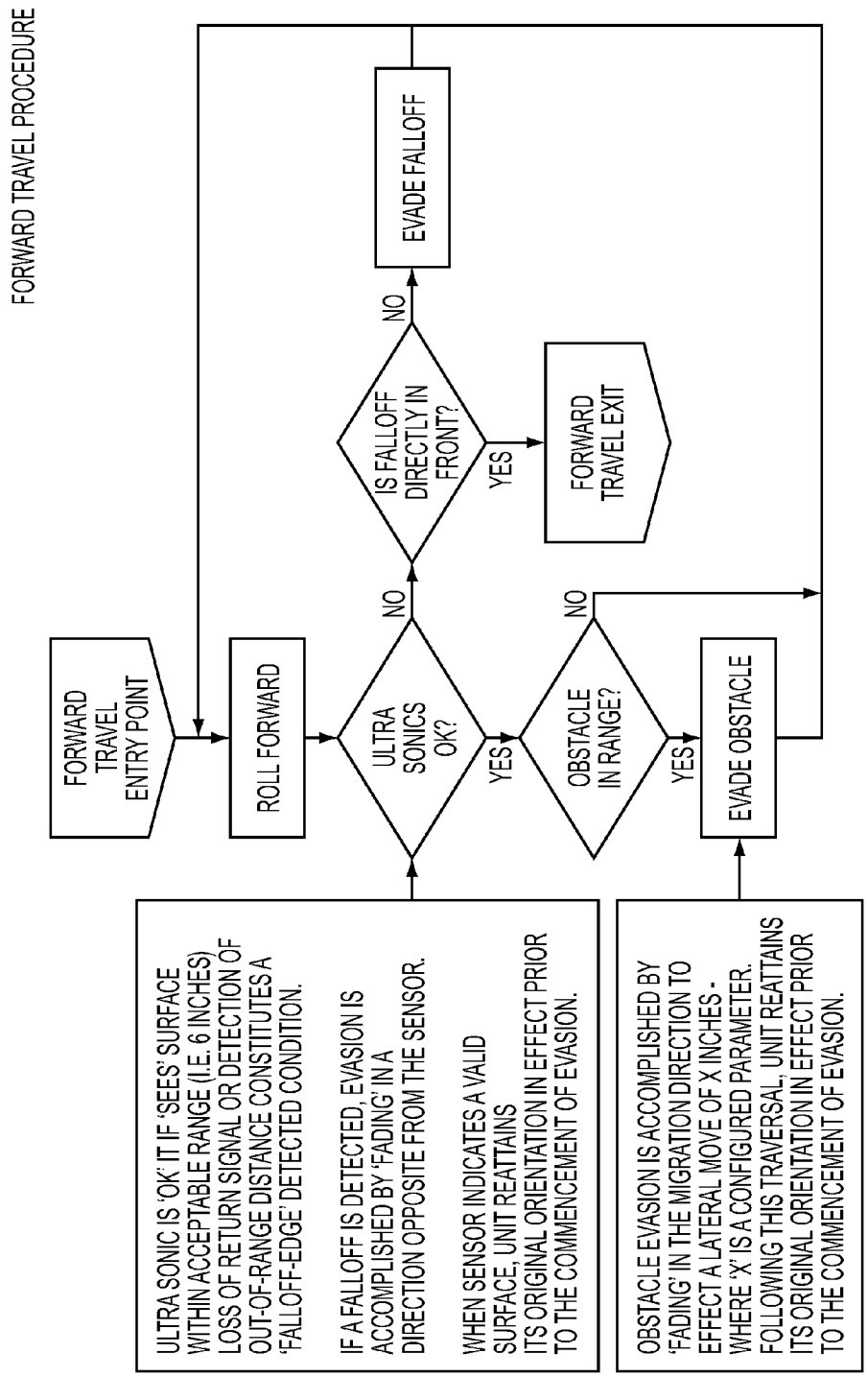

FIG. 18 is a flow chart describing a procedure called "forward travel," in one embodiment. The step labeled "ultrasonics OK?" refers to the ultrasonic range detectors. The answer to this query is yes if the range detectors sense a surface within an acceptable range (e.g., six inches). The loss of a return signal, or the detection of an "out of range" distance, indicates an imminent "falloff-edge" detected condition. If a falloff condition is imminent, the "evade falloff" step is accomplished—which includes executing an evasive maneuver by "fading" in a direction opposite from the sensor. After fading, when the sensors indicate a valid surface, the vehicle re-attains its original heading and orientation that was in effect prior to the evasive maneuver.

The step labeled "evade obstacle" is accomplished by fading in the migration direction, to accomplish a lateral move of X inches, where X is a configured parameter. Following this lateral move, the vehicle re-attains its original heading and orientation that was in effect prior to the evasive maneuver.

Figure 19:
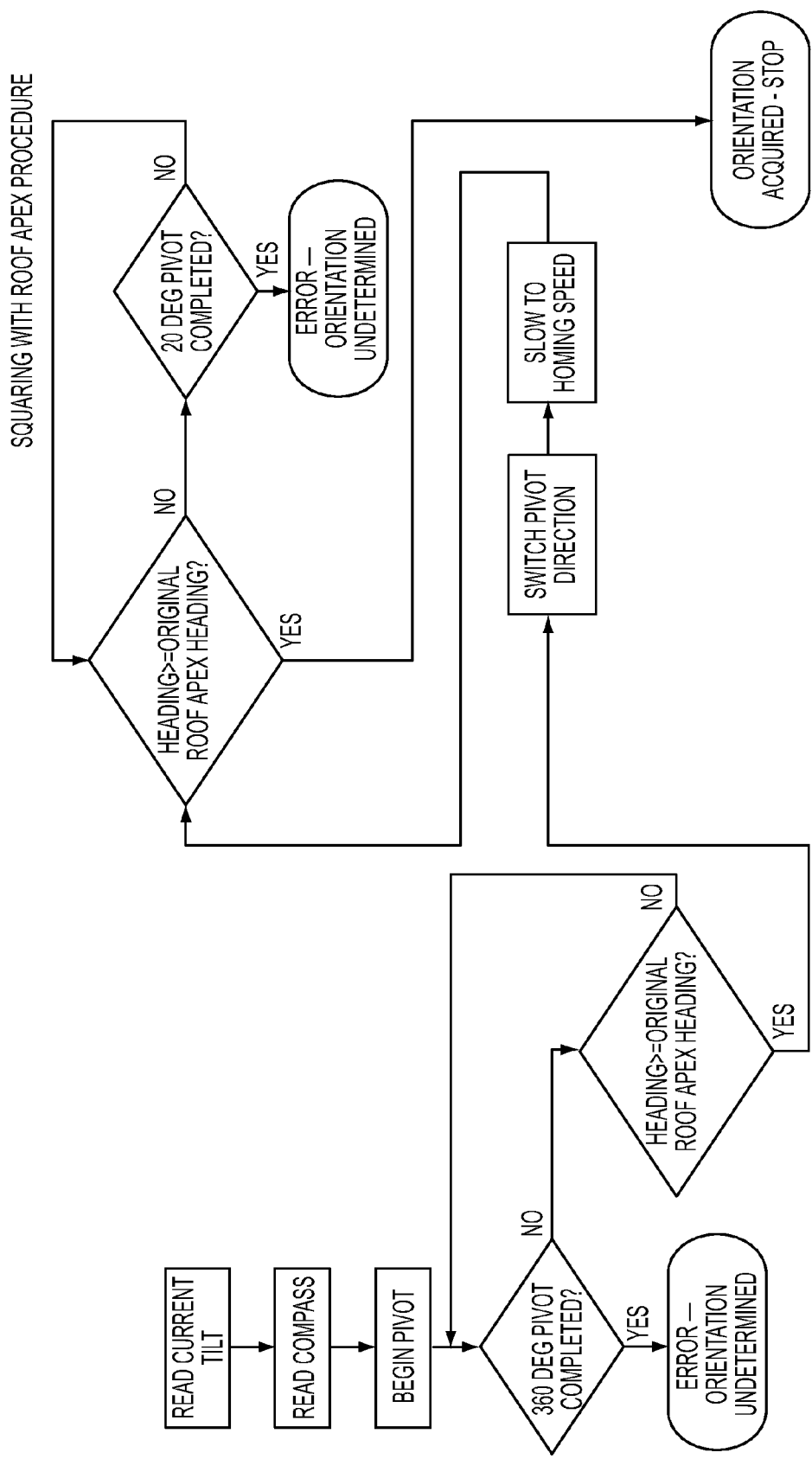

FIG. 19 is a flow chart describing a procedure called "squaring with roof apex," in one embodiment.

Figure 20:
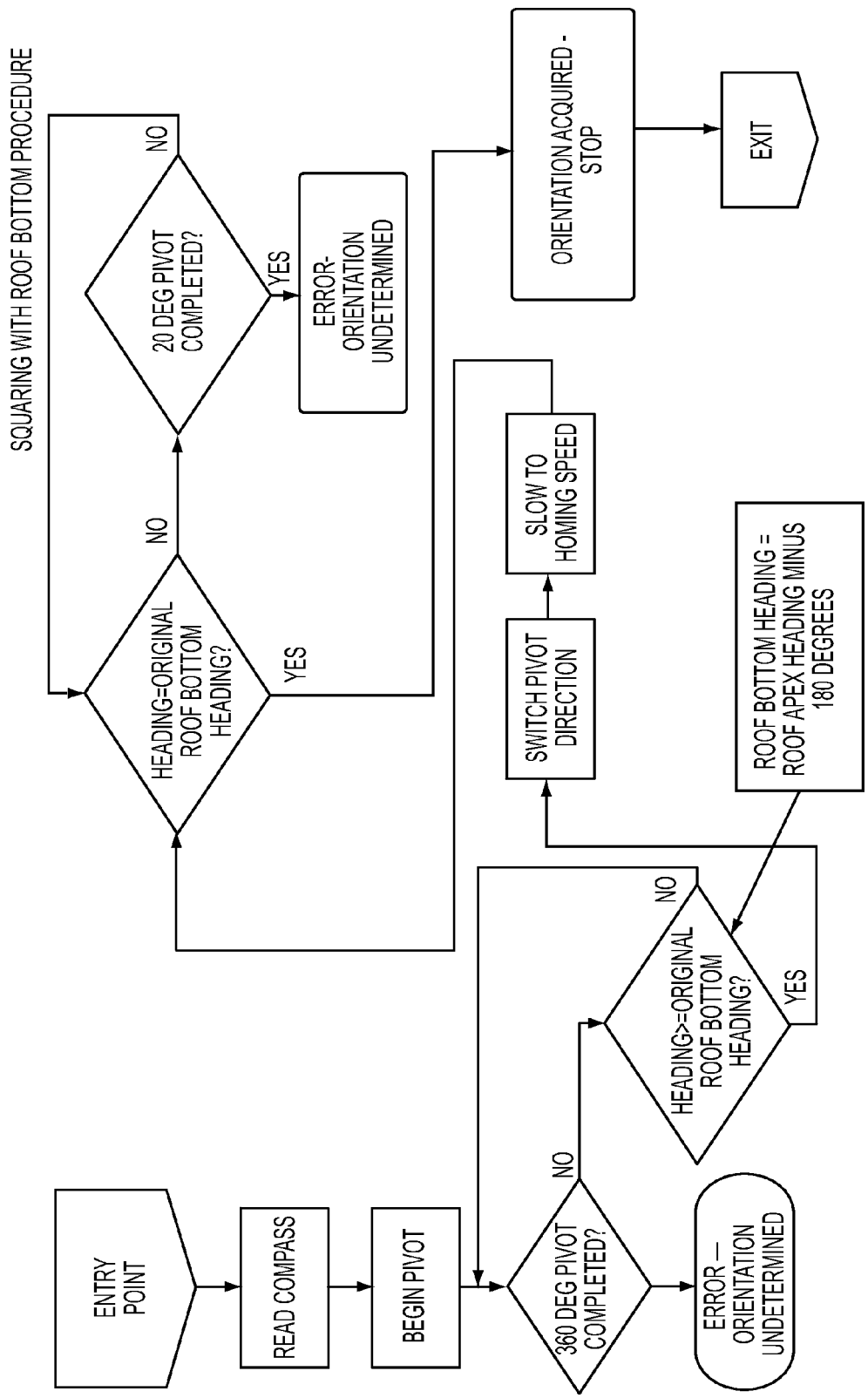

FIG. 20 is a flow chart describing a procedure called "squaring with roof bottom," in one embodiment.

Figure 21:
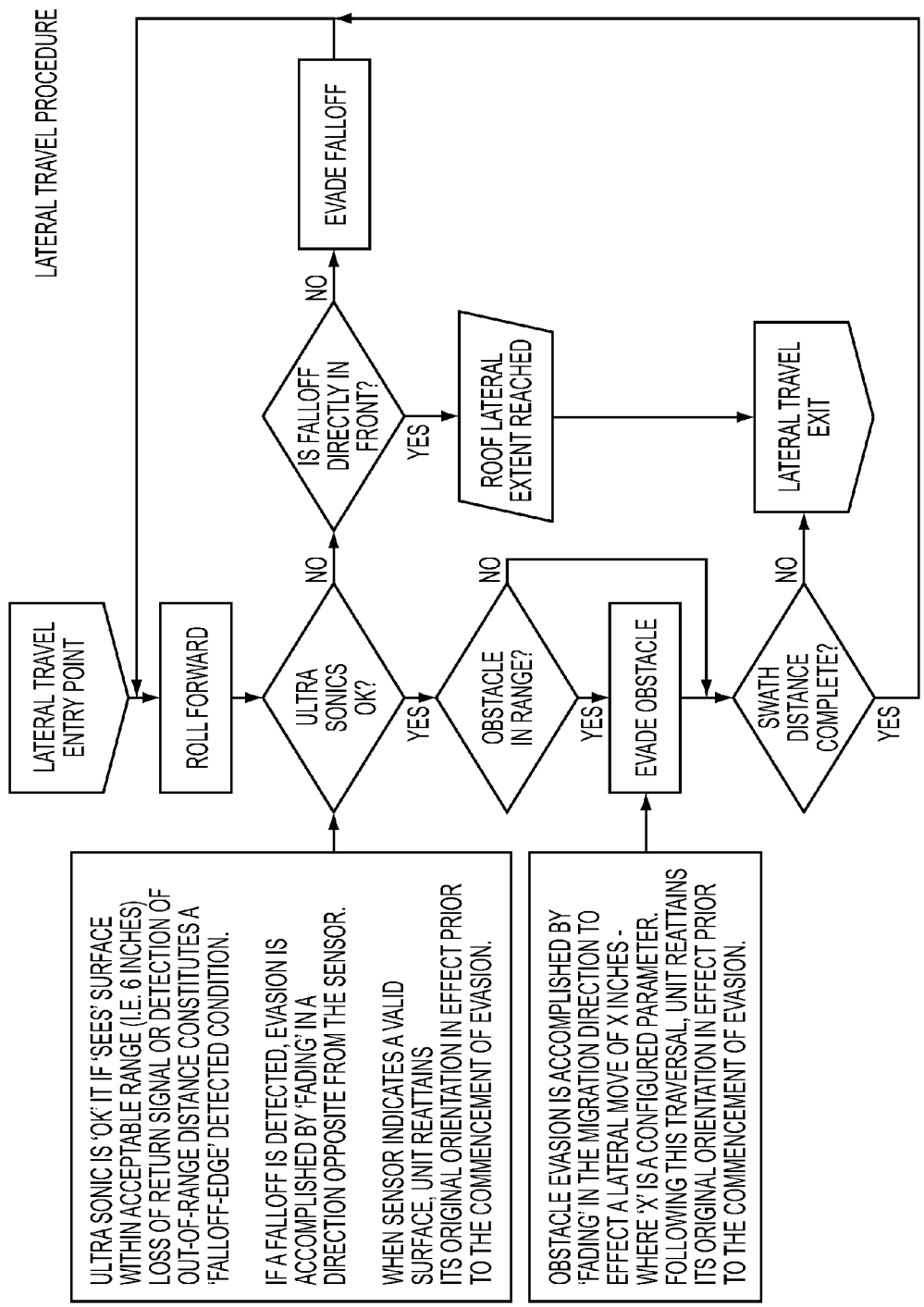

FIG. 21 is a flow chart describing a procedure called "lateral travel," in one embodiment. The steps labeled "ultrasonics OK?" and "evade falloff" and "evade obstacle" are accomplished in a similar manner as described for FIG. 18.

Figure 22:
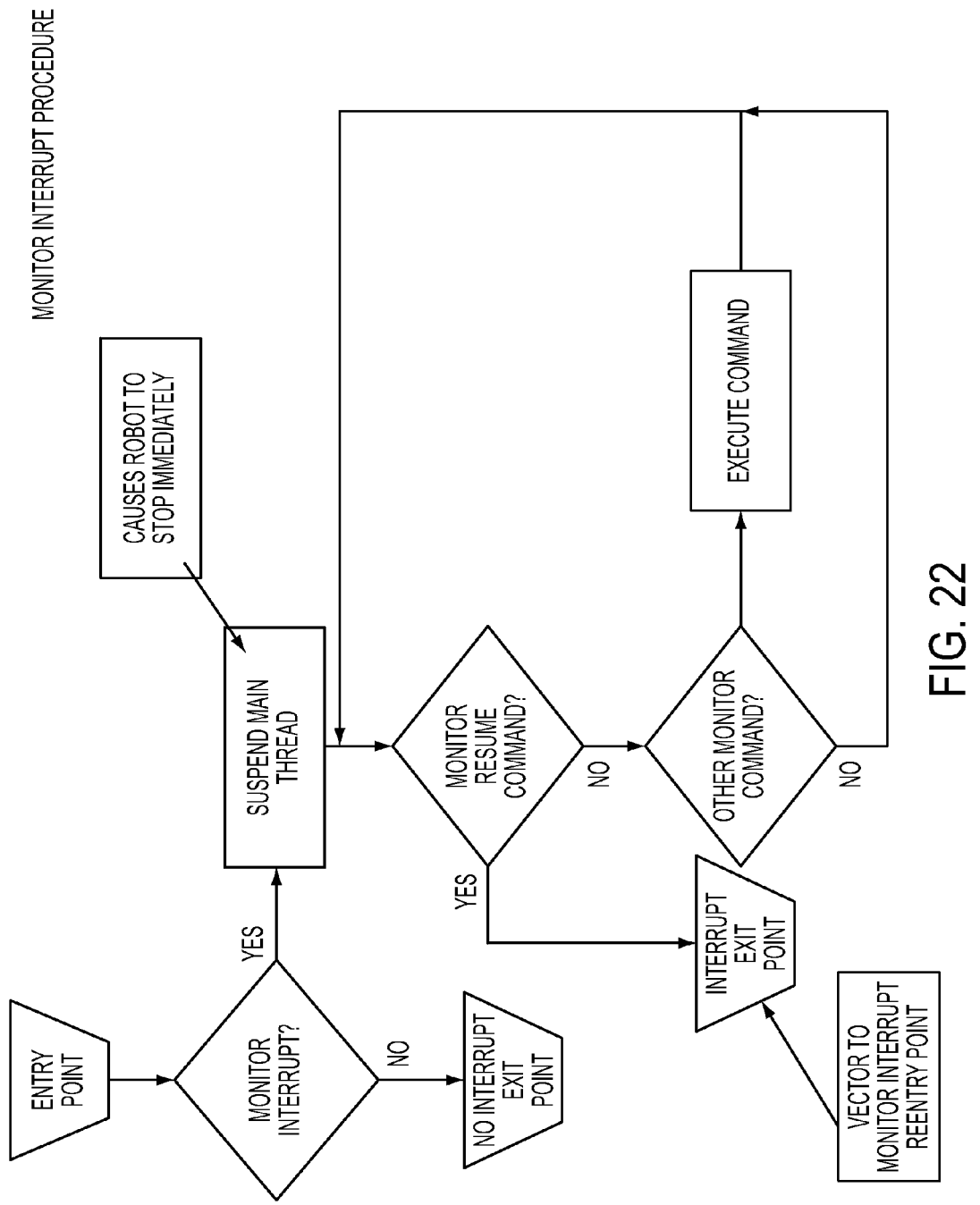

FIG. 22 is a flow chart describing a procedure called "monitor interrupt," in one embodiment. The term monitor refers to a remote computer 185 (shown in FIG. 5) which may be used to receive a streaming video feed from the vehicle. The procedure describes how the system would re-start after an interruption of the signal (the video feed, for example) to the remote computer 185.

Figure 23:
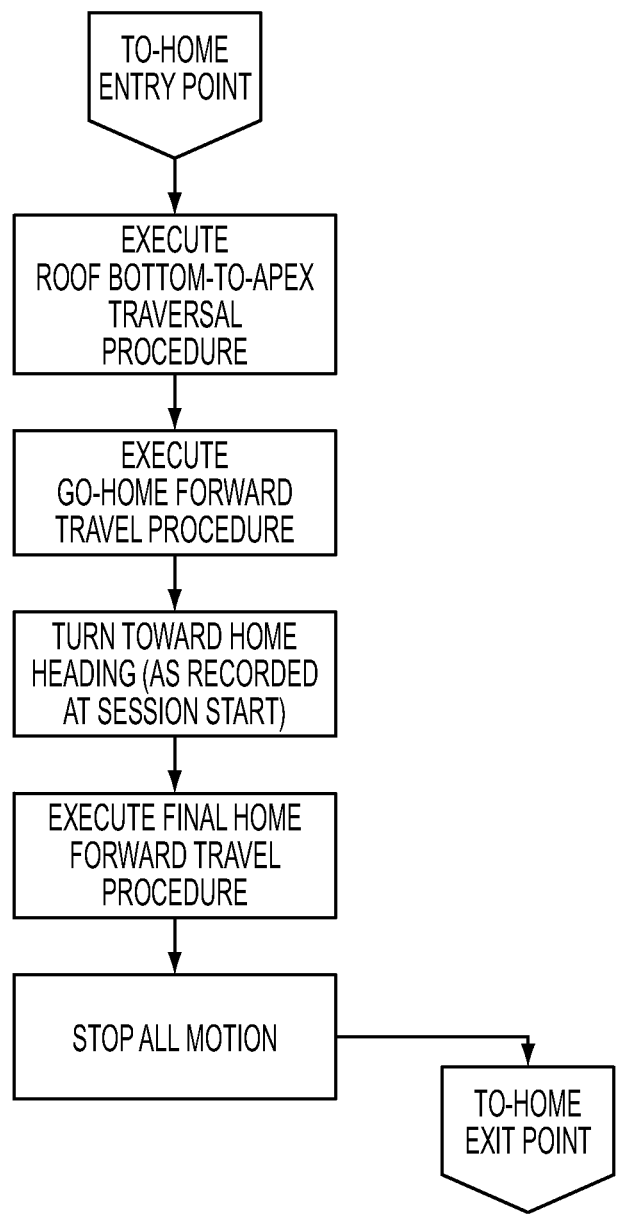

FIG. 23 is a flow chart describing a procedure called "to-home," in one embodiment. The home base may be a panel or platform 178 such as the one described and shown in FIG. 10, or it may be any other location.

Figure 24:
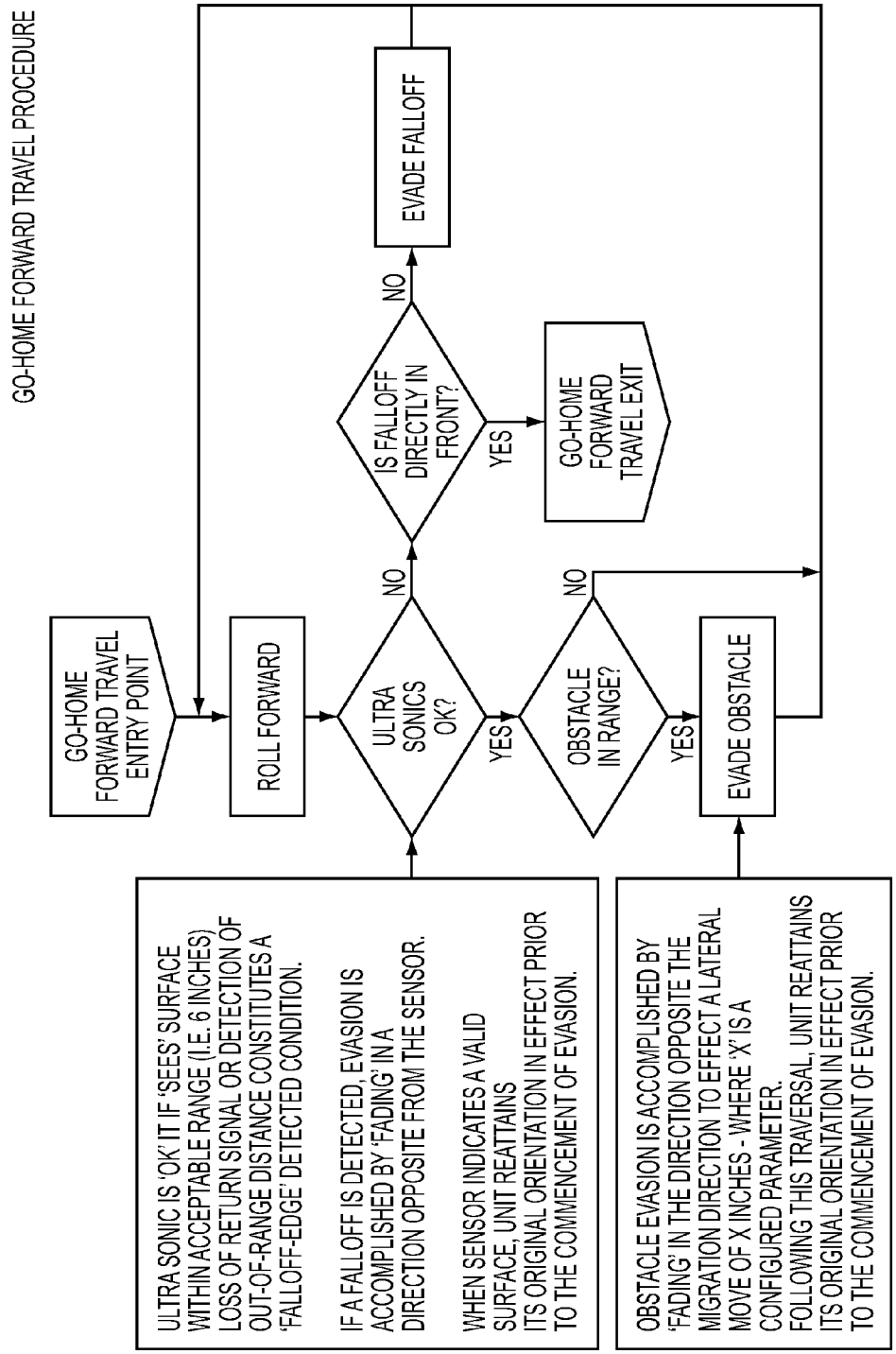

FIG. 24 is a flow chart describing a procedure called "go-home forward travel," in one embodiment. The steps labeled "ultrasonics OK?" and "evade falloff" and "evade obstacle" are accomplished in a similar manner as described for FIG. 18.

Figure 25:
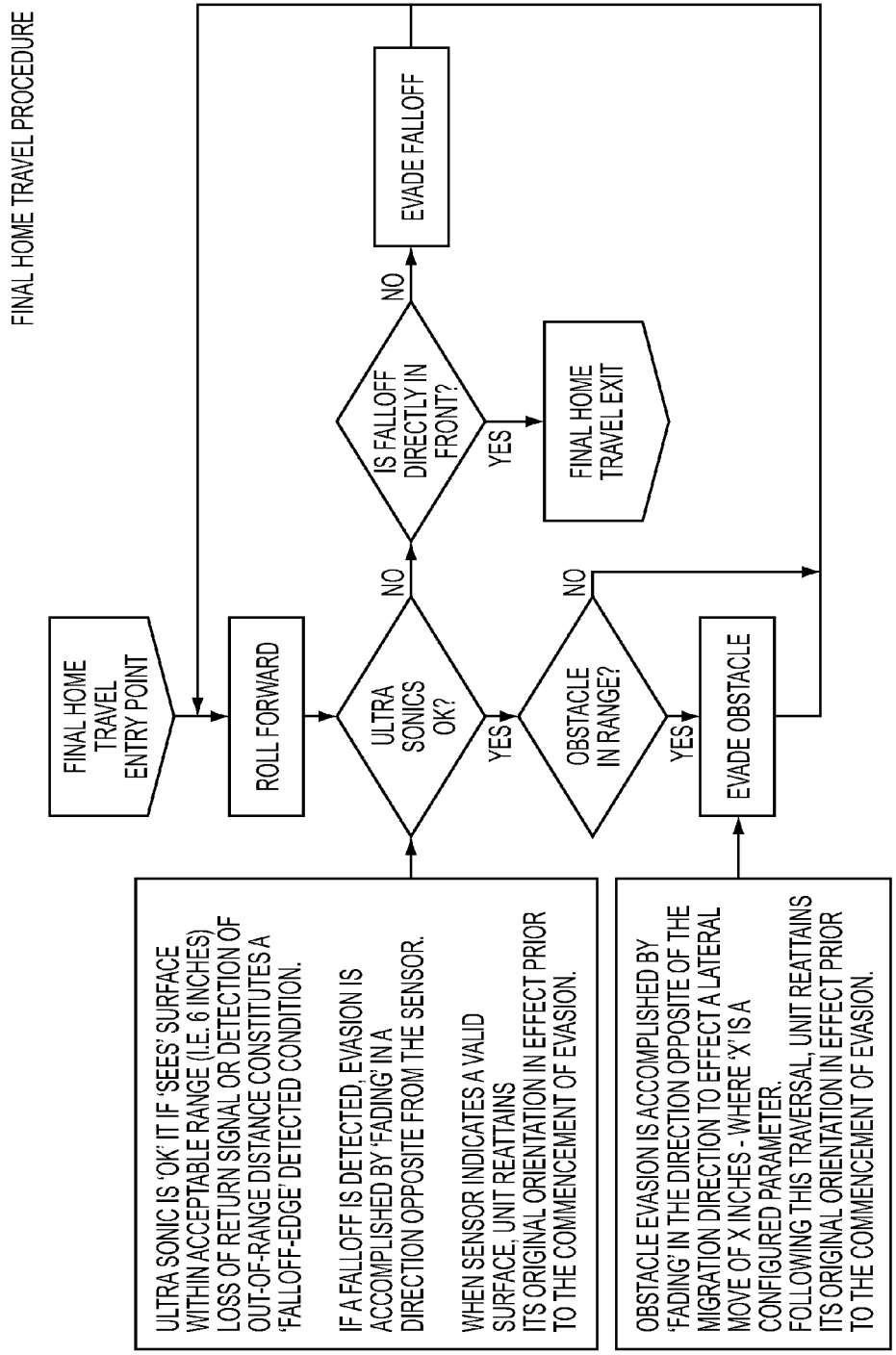

FIG. 25 is a flow chart describing a procedure called "final home travel," in one embodiment. Again, the steps labeled "ultrasonics OK?" and "evade falloff" and "evade obstacle" are accomplished in a similar manner as described for FIG. 18.

Impression System

In one embodiment, illustrated schematically in FIG. 9, the vehicle may include an impression system 500 for obtaining an impression of a suspect area on the roof surface. For example, the imaging system may detect a depression in a roof shingle that may be a hail strike or a heat blister. A roof inspector on foot might use paper and a charcoal or crayon to make a rubbing of the depression. In this embodiment of the vehicle, the impression system 500 may include a supply of media (e.g., paper or film), a positioner to place the media on the suspect area, a crayon, stamp or inked roller to impress the media onto the suspect area, and a tray for storing the resulting impressions.

Inspection System

In another aspect, the vehicle described herein may be part of a roof inspection system. In one embodiment, the roof inspection system includes a vehicle, a lift system 170 for placing the vehicle on the roof, and a computer program for analysis of the data obtained during the inspection.

Lift System

In one embodiment of the lift system 170, the vehicle may be placed on the roof manually by carrying it up a ladder and placing it on the roof.

In another embodiment, not illustrated, a pole with a hook or other releasable fastener at the end, for engagement with a mating element on the vehicle, may be used to lift the vehicle up and onto the roof. The pole may be fixed in length or adjustable.

In another embodiment, illustrated in FIG. 10, the lift system 170 may include a ladder or ramp 172 having a high-traction surface 174 and/or a series of panels 176 to allow the vehicle to drive up the ramp and onto the roof. As shown, the ladder or ramp 172 may include telescoping segments so that it is expandable and collapsible for easy transport and setup. The ramp 172 may also be equipped with an angular indicator or level 177 so the operator can arrange the ramp 172 at or near the suggested angle for use. The high-traction surface or "mat" 174 may be stowed temporarily on a roller, as shown. If rungs are present on the ladder or ramp 172, then the mat 174 may be extended atop the rungs and the vehicle may have sufficient traction to travel up the mat 174 and onto the roof. In an alternative arrangement, a series of panels 176 may be sized and shaped to fit the sections of the ramp 172. The panels 176 may be releasable attached to the ramp 172. As shown, the lift system 170 may also include a flexible platform 178 that, when in place, extends from the top of the ladder or ramp 172 onto the roof surface. In this aspect, the platform 178 may operate as a base or home location for the vehicle.

In another embodiment, illustrated in FIG. 11, the lift system 170 may include a ladder or ramp 172 and a hoist assembly. The hoist assembly, as shown, may include a platform 178 for holding the vehicle on a wheeled carriage 175, which is attached to a cable and pulley system for lifting the carriage 175, either manually or with a motor, up the ramp 172 and onto the roof. As shown, the ladder or ramp 172 may include hinged segments so that it can be folded for easy transport and setup. The ramp 172 may also be equipped with an angular indicator or level (not shown) so the operator can arrange the ramp 172 at or near the suggested angle for safe and proper use. The lift system 170 may also include a flexible platform at the top of the ramp 172 (not shown) which, when in place, extends from the top of the ramp 172 onto the roof surface of the roof and operates as a base or home location for the vehicle.

Remote Analysis

In one embodiment, the system may include a computer program for analyzing the images obtained using, for example, digital image analysis software or other three-dimensional imaging techniques. In one embodiment, digital image analysis software may be used to discern the existence, nature, density and severity of roof damage in particular areas of interest in the digital image record gathered by the vehicle.

As described briefly above in the discussion of the onboard control system, all the data from each and every segment of the roof traversed by the vehicle may be stored and downloaded for later analysis. For example, data such as the compass heading, pitch, roll, time, date, and distance traveled may be used to make a virtual model of the roof. From such a virtual model, information such as total area, roof pitch at specific locations, and the location of particular topographic characteristics or flaws (damage) may be quantified.

The computer program, in one embodiment, may include algorithms particularly designed to analyze a specific area in order to determine whether a particular feature or flaw represents damage (from hail, for example) or instead represents normal wear. In this aspect, the vehicle and its systems may be used to both provide an objective record of the roof condition and an objective analysis of the features observed.

Business Model

In another aspect, the vehicle and related systems described herein may be used to inspect a roof and provide reports and recommendations that are based on the objective evidence obtained by the vehicle, instead of the subjective opinion of a particular roof inspector.

The vehicle and its related systems make a persistent visual record of the subject roof, thereby allowing people and companies with potentially competing interests the opportunity to review an objective record of the roof condition.

In one embodiment, the method may include the steps of positioning an inspection vehicle onto a roof, navigating and inspecting a select portion of the roof, obtaining images of the roof. The method may include the further steps of analyzing the images, analyzing the physical data obtained, producing a report, making recommendations, and in certain embodiments making an insurance claim evaluation and decision based on policy criteria and limitations. The method may also include collecting revenue in exchange for the images, the data, the report, or any other information gathered during the inspection process.

In another embodiment, the method may also include the step of leasing the inspection vehicle to a person or enterprise engaged in roof inspections.

CONCLUSION

Although the vehicles, systems, and methods are described herein in the context of inspecting a roof, the technology disclosed herein is also useful and applicable in other contexts. Moreover, although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims or concepts that follow, such terms are used in a generic and descriptive sense only, and should not be construed as limiting the described invention or the claims that follow.

We claim:

1. A vehicle comprising:
 a chassis supported above a terrain by a pair of substantially continuous tracks near opposing left and right sides of said chassis, each of said tracks engaged with at least one driven sprocket and at least one free sprocket, wherein said chassis has a front end and a rear end with a longitudinal axis extending therebetween, and an upper deck and a generally opposing bottom surface, wherein said bottom surface defines a first clearance near said ends and a second clearance along a substantially transverse axis extending between said sides and located intermediate said ends;
 a motive system supported by said chassis and operative to propel said vehicle, wherein said motive system comprises said pair of tracks, at least one motor connected to and operative to propel said vehicle by engaging one or more of said at least one driven sprockets, and a partially collapsible tread attached along each of said pair of tracks, wherein said partially collapsible tread and said second clearance cooperate to substantially prevent overturning of said vehicle;
 a power system supported by said chassis and providing energy to power said vehicle;
 an imaging system supported by said chassis and comprising a video control system, a video camera lens assembly spaced apart from and above said chassis, and a wireless router for transmitting video to a remote console;
 a sensor system supported by said chassis and comprising one or more positional sensors and a plurality of range sensors; and
 a control system supported by said chassis and electrically connected to said motive system, said power system, said imaging system, and said sensor system, wherein said control system comprises one or more microcontrollers dedicated to monitoring said sensor system, processing said video, activating said motive system, and receiving signals from said remote console, wherein said remote console comprises user interface controls and a wireless transmitter.

2. The vehicle of claim 1, wherein said control system further comprises a guidance routine that, in cooperation with said imaging system and said sensor system, directs the motion of said vehicle in an autonomous mode across said terrain, and wherein said guidance routine comprises instructions to direct said vehicle:
 (a) to move forward from a starting location until said sensor system indicates a hazard or boundary;
 (b) to turn said vehicle away from said hazard or boundary; and
 (c) to autonomously survey said terrain by repeating steps (a) and (b) until said vehicle returns to an ending location near said starting location.

3. The vehicle of claim 1, wherein said second clearance is substantially greater than said first clearance when said chassis is positioned on a substantially planar surface.

4. The vehicle of claim 1, wherein said user interface controls comprise one or more devices selected from the group consisting of a push button, a switch, and a joystick.

5. The vehicle of claim 1, wherein said imaging system further comprises a data storage system for storing said video.

6. The vehicle of claim 1, wherein said motive system further comprises a selectively releasable adhesive layer between said partially collapsible tread and each of said tracks.

7. The vehicle of claim 1, wherein said one or more positional sensors comprises one or more of a compass, a three-axis gyroscope, a GPS module, and a shaft encoder.

8. The vehicle of claim 1, wherein said plurality of range sensors comprises a plurality of ultrasonic range detectors.

9. A vehicle comprising:
 a chassis supported above a terrain and having an upper deck and a generally opposing bottom surface;
 a motive system supported by said chassis and comprising at least one motor operative to propel said vehicle and one or more partially collapsible treads for frictionally engaging said terrain;
 a power system supported by said chassis and providing energy to power said vehicle;
 an imaging system supported by said chassis and comprising a camera lens assembly spaced apart from and above said chassis, and a wireless router for transmitting camera images to a remote console;
 a sensor system supported by said chassis and comprising one or more positional sensors and a plurality of range sensors; and
 a control system supported by said chassis and electrically connected to said motive system, said power system, said imaging system, and said sensor system, wherein said control system comprises one or more microcontrollers dedicated to monitoring said sensor system, processing said camera images, activating said motive system, and receiving signals from said remote console, wherein said remote console comprises user interface controls and a wireless transmitter.

10. The vehicle of claim 9, wherein said motive system further comprises:
 a pair of substantially continuous tracks near opposing left and right sides of said chassis, each of said tracks engaged with at least one driven sprocket driven by said motor and at least one free sprocket, wherein said one or more partially collapsible treads is attached along said pair of tracks.

11. The vehicle of claim 10, wherein said motive system further comprises a selectively releasable adhesive layer between said one or more partially collapsible treads and one or more of said pair of tracks.

12. The vehicle of claim 11, wherein said chassis has a front end and a rear end with a longitudinal axis extending therebetween, and wherein said bottom surface defines a first clearance near said ends and a second clearance along a substantially transverse axis extending between said sides and located intermediate said ends.

13. The vehicle of claim 12, wherein said second clearance is substantially greater than said first clearance when said chassis is positioned on a substantially planar surface, and wherein said one or more partially collapsible treads and said second clearance cooperate to substantially prevent overturning of said vehicle.

14. The vehicle of claim 9, wherein said imaging system further comprises:
a video system comprising a video camera lens assembly spaced apart from and above said chassis for capturing video images, wherein said wireless router transmits said video images to said remote console; and
a data storage system for storing said camera images and said video images.

15. The vehicle of claim 9, wherein said control system further comprises a guidance routine that, in cooperation with said imaging system and said sensor system, directs the motion of said vehicle in an autonomous mode across said terrain, and wherein said guidance routine comprises instructions to direct said vehicle:
(a) to move forward from a starting location until said sensor system indicates a hazard or boundary;
(b) to turn said vehicle away from said hazard or boundary; and
(c) to autonomously survey said terrain by repeating steps (a) and (b) until said vehicle returns to an ending location near said starting location.

16. The vehicle of claim 9, wherein said one or more positional sensors comprises one or more of a compass, a three-axis gyroscope, a GPS module, and a shaft encoder.

17. The vehicle of claim 9, wherein said plurality of range sensors comprises a plurality of ultrasonic range detectors.

* * * * *